United States Patent
Bulakci et al.

(10) Patent No.: US 12,069,638 B2
(45) Date of Patent: Aug. 20, 2024

(54) NETWORK ENTITY AND USER EQUIPMENT FOR EXPLOITING RESILIENCE TO CONSECUTIVE TRANSMISSION FAILURES

(71) Applicant: Huawei Technologies Co., Ltd., Shenzhen (CN)

(72) Inventors: Ömer Bulakci, Munich (DE); Ali Ramadan Ali, Munich (DE); Daniel Medina, Munich (DE); Serkan Ayaz, Munich (DE); Hanwen Cao, Munich (DE); Chenghui Peng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 347 days.

(21) Appl. No.: 17/516,288

(22) Filed: Nov. 1, 2021

(65) Prior Publication Data
US 2022/0053509 A1 Feb. 17, 2022

Related U.S. Application Data

(63) Continuation of application No. PCT/EP2019/061019, filed on Apr. 30, 2019.

(51) Int. Cl.
*H04W 72/12* (2023.01)
(52) U.S. Cl.
CPC .................................. *H04W 72/12* (2013.01)
(58) Field of Classification Search
None
See application file for complete search history.

(56) References Cited

U.S. PATENT DOCUMENTS

| | | |
|---|---|---|
| 2009/0003282 A1 | 1/2009 | Meylan et al. |
| 2015/0092645 A1 | 4/2015 | Tabet et al. |
| 2019/0149365 A1* | 5/2019 | Chatterjee ........... H04L 25/0226 370/329 |
| 2019/0327760 A1* | 10/2019 | Holfeld ............. H04W 72/0446 |
| 2020/0296749 A1* | 9/2020 | Freda .................... H04W 72/20 |

OTHER PUBLICATIONS

TSG RAN WG2, "LS on TSN requirements evaluation," 3GPP TSG-RAN WG2 Meeting #103bis, Chengdu, China, R2-1816043, total 3 pages, 3rd Generation Partnership Project, Valbonne, France (Oct. 8-12, 2018).

(Continued)

*Primary Examiner* — Kenny S Lin
(74) *Attorney, Agent, or Firm* — Leydig, Voit & Mayer, Ltd.

(57) ABSTRACT

A Quality of Service (QOS) framework of mobile and wireless communication networks, particularly, the Fifth Generation (5G) QoS framework include a Radio Access Network (RAN) entity and User Equipment (UE) for enabling RAN awareness of a tolerance of an application to transmission failures of application data, and QoS treatment based on this resilience. The RAN entity is configured to receive information indicating at least one resilience parameter of the application, from a control entity, another RAN entity, and/or UE. The at least one resilience parameter is based on the tolerance of the application to transmission failures, in particular, consecutive transmission failures.

14 Claims, 18 Drawing Sheets

1700

1701 Receive information indicating at least one resilience parameter of an application, from a control entity, another RAN entity, and/or a UE, wherein the at least one resilience parameter is based on a tolerance of the application to transmission failures of application data, in particular consecutive transmission failures.

(56) References Cited

OTHER PUBLICATIONS

RAN3, "Reply LS on TSN requirements evaluation," 3GPP TSG-RAN WG3 Meeting #102, Spokane, USA, R3-187252, total 1 page, 3rd Generation Partnership Project, Valbonne, France (Nov. 12-16, 2018).

SA2, "LS on TSN integration in the 5G System," SA WG2 Meeting #128bis, Sophia Antipolis, France, S2-189051 (e-mail revision 1 of S2-188461), total 1 page, 3rd Generation Partnership Project, Valbonne, France (Aug. 20-24, 2018).

Nokia, Nokia Shanghai Bell, "Revised SID: Study on NR Industrial Internet of Things (Iot)," 3GPP TSG RAN meeting #81, Gold Coast, Australia, RP-182090, total 5 pages, 3rd Generation Partnership Project, Valbonne, France (Sep. 10-13, 2018).

"3rd Generation Partnership Project; Technical Specification Group Services and System Aspects; Service requirements for cyber-physical control applications in vertical domains; Stage 1 (Release 16)," 3GPP TS 22.104 V16.1.0, total 54 pages, 3rd Generation Partnership Project, Valbonne, France (Mar. 2019).

"3rd Generation Partnership Project; Technical Specification Group Services and System Aspects; Architecture enhancements for V2X services (Release 16)," 3GPP TS 23.285 V16.0.0, total 37 pages, 3rd Generation Partnership Project, Valbonne, France (Mar. 2019).

"3rd Generation Partnership Project; Technical Specification Group Services and System Aspects; System Architecture for the 5G System; Stage 2 (Release 16)," 3GPP TS 23.501 V16.0.2, total 317 pages, 3rd Generation Partnership Project, Valbonne, France (Apr. 2019).

"3rd Generation Partnership Project; Technical Specification Group Services and System Aspects; Study on enhancement of 5G System (5GS) for vertical and Local Area Network (LAN) services (Release 16)," 3GPP TR 23.734 V16.1.0, total 111 pages, 3rd Generation Partnership Project, Valbonne, France (Mar. 2019).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.5.0, total 363 pages, 3rd Generation Partnership Project, Valbonne, France (Mar. 2019).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.5.1, total 948 pages, 3rd Generation Partnership Project, Valbonne, France (Apr. 2019).

* cited by examiner

| SQI Value | Resource Type | Default Priority Level | Packet Delay Budget | Survival Time | Packet Error Rate (PER=ERS when ST is non-zero) | Default Maximum Data Burst Volume | Default Averaging Window |

200 →

201 — Survival Time
202 — Packet Error Rate (PER=ERS when ST is non-zero)

Receive information indicating at least one resilience parameter of an application, from a control entity, another RAN entity, and/or a UE, wherein the at least one resilience parameter is based on a tolerance of the application to transmission failures of application data, in particular consecutive transmission failures.

1801 — Receive control information, wherein the control information comprises a dynamic resource allocation to override or extend a configured resource allocation for a subsequent SPS transmission of application data to and/or from a UE, wherein the dynamic resource allocation provides a higher redundancy for the subsequent transmission than the configured resource allocation.

FIG. 18

NETWORK ENTITY AND USER EQUIPMENT FOR EXPLOITING RESILIENCE TO CONSECUTIVE TRANSMISSION FAILURES

CROSS-REFERENCE TO RELATED APPLICATIONS

This application is a continuation of International Application No. PCT/EP2019/061019, filed on Apr. 30, 2019, the disclosure of which is hereby incorporated by reference in its entirety.

FIELD

The present disclosure relates to mobile and wireless communication networks, particularly to the Fifth Generation (5G). In particular, the disclosure is concerned with Radio Access Network (RAN) awareness of application parameters indicating a resilience of the application to consecutive transmission failures of application data. The disclosure further relates to Quality-of-Service (QOS) treatment based on these application parameters, in order to fulfill requirements imposed by new services, particularly 5G services. The disclosure presents a RAN entity, a User Equipment (UE), and methods for enabling the RAN awareness and QoS treatment.

BACKGROUND

The next generation of cellular mobile and wireless communications, namely 5G, envisions new use cases, services and applications, such as enhanced mobile broadband (eMBB), ultra-reliable low-latency communications (URLLC) and massive machine-type communications (mMTC). Any combination of these use cases is also possible, such as ultra-reliable communications, low-latency communications, or low-latency eMBB communications.

The Industrial Internet of Things (IOT) within the framework of the Fourth Industrial Revolution (Industry 4.0) requires special 5G services, which include mission-critical communications. The IIoT can be part of, e.g., factory or process automation. A technological framework that can be utilized by IIoT devices is Time-Sensitive Networking (TSN). Two key requirements for mission-critical IIoT services are ultra-low latency (e.g., 1 ms) and ultra-high communication service availability (e.g., 99.9999% and higher). Packets typically arrive on a cyclic basis (e.g., every 1 ms, which is referred to as the transfer interval or cycle time). In factory automation use cases (e.g., motion control), packets must be delivered reliably and in time, since delayed or lost packets can result in downtime of the production. Nevertheless, not every packet loss may cause a service downtime. Some applications may tolerate a few packet errors or losses before the communication service is declared unavailable.

A relevant term describing such resilience to packet errors is the so-called survival time. The survival time is defined, e.g., in 3GPP TS 22.104, as the time that an application consuming a communication service may continue without an anticipated message. The survival time can also be defined as the maximum number of consecutive incorrectly received or lost messages before the communication service is deemed to be unavailable. If the survival time is exceeded, the application transitions the communication service into a down state. In this case, the production may stop (e.g., due to safety reasons) resulting in financial cost.

The 5G System (5GS) is one example of a system that can address the requirements of the aforementioned services. 5G Quality-of-Service (QOS) enforcement mechanisms are designed to address the communication service requirements, e.g., by allocating an adequate amount of radio resources. In the 5GS, a QoS flow defines the finest granularity of QoS differentiation in a Protocol Data Unit (PDU) session. A QoS Flow ID (QFI) is used to identify a QoS flow. User plane traffic with the same QFI within a PDU session receives the same traffic forwarding treatment (e.g., scheduling and admission threshold). A QOS flow is characterized by a QoS profile. The QOS profiles in the current 5GS include Qos characteristics, such as packet delay budget (PDB) and packet error rate (PER), identified by a 5G QoS Identifier (5QI) and Allocation and Retention Priority (ARP). Packets inside a Qos flow are treated based on these key performance indicators (KPIs). For example, a strict delay requirement can imply a prioritized scheduling of a packet. However, current QoS enforcement mechanisms treat packets independently from each other based on the QoS profile of the QoS flow.

Two observations can be made with regard to the existing 5G QoS mechanisms:
  The Radio Access Network (RAN) is not aware of an application's resilience to consecutive transmission failures of the application data.
  The 5G QoS framework applies a packet-wise treatment and does not take into account an application's resilience to consecutive transmission failures of application data.

SUMMARY

Embodiments of the present disclosure improve the QoS framework. An objective is to enhance the current QoS mechanisms, for example 5G QoS mechanisms, such that the 5GS, in particular the RAN, can address the requirements imposed by new 5G services in an efficient manner.

This may be done by exploiting knowledge of an application's resilience to consecutive transmission failures. To this end, packet treatment may be modified. Further, resilience parameters indicating a tolerance of an application to consecutive transmission failures of application data, particularly the survival time of the application, may be taken into account. Further, the RAN may be aware of these resilience parameters, particularly the RAN may be aware of the survival time of the application.

As detailed in the following, the survival time of the application may be translated into a communication network parameter, e.g., a 5GS parameter, which is based on the survival time of the application and RAN is made aware of such communication parameter. In addition, the application data may be processed by the communication network to be able to transmit the application data via the communication network, which may include, e.g., adding or removing packet headers, packet segmentation, or packet re-assembly. An application data can be processed by a User Plane (UP) entity, e.g., User Plane Function (UPF) in a Core Network, and RAN User Plane (UP) protocol functions, such as Packet Data Convergence Protocol (PDCP), Radio Link Control (RLC), and Medium Access Control (MAC). For the sake of simplicity, in the following, a communication network packet including the application data is referred to as application data.

A first aspect of the disclosure provides a RAN entity, configured to receive information indicating at least one resilience parameter of an application, from a control entity, another RAN entity, and/or a UE, wherein the at least one resilience parameter is based on a tolerance of the application to transmission failures of application data, in particular consecutive transmission failures.

The control entity may be a core network (CN) entity, or a RAN controller, or a management entity. The management entity can be an Operations, Administration and Maintenance (OAM) entity, a Network Slice Management Function (NSMF) or a Network Slice Subnet Management Function (NSSMF). The UE can be any type of terminal device, e.g., a mobile terminal, a sensor, an actuator, an IoT device, or a device that may not require a user. The RAN entity of the first aspect may be a base station, e.g., a next generation NodeB (gNB), a 5G access node, an Integrated Access and Backhaul (IAB) node, or an IAB donor node, or a Central Unit (CU) or a Distributed Unit (DU) of a disaggregated 5G access node, a Control Plane (CP) or User Plane (UP) of an access node, or may be a UE.

By receiving the at least one resilience parameter, the RAN entity is made aware of the tolerance of the application to transmission failures, e.g., of the survival time of the application. The RAN entity can use the awareness of this tolerance to implement an appropriate QoS treatment, and/or may share the at least one resilience parameter with another entity applying the QoS treatment. In this way, the current 5G QOS mechanisms can be enhanced based on the RAN entity, such that requirements imposed by new 5G services can be addressed in an efficient manner.

In an implementation of the first aspect, the information comprises the at least one resilience parameter, or the information identifies the at least one resilience parameter, which is configured at the RAN entity.

That means, the control entity, other RAN entity and/or UE can send the at least one resilience parameter to the RAN entity of the first aspect. Alternatively, the at least one resilience parameter is already configured—e.g., along with other resilience parameters—at the RAN entity, e.g., in a table or QoS profile. The table can be a QOS table including Qos characteristics. The control entity, other RAN entity and/or UE can in this case send an identifier to the RAN entity, which identifies the at least one resilience parameter, e.g., in the table or QoS profile, at the RAN entity of the first aspect. The information may, for instance, comprise a 5QI value to indicate the at least one resilience parameter in a corresponding QoS profile, in particular in a QoS table.

In an implementation of the first aspect, the resilience parameter indicates a maximum tolerable number of consecutive transmission failures, or the resilience parameter indicates a survival time (ST) of the application in case of one or more transmission failures.

In this case, the at least one resilience parameter directly indicates the tolerance of the application to transmission failures. The at least one resilience parameter can be at least one parameter that is a translated version of the ST of the application.

In an implementation of the first aspect, the resilience parameter indicates a plurality of robustness levels to be used, in particular sequentially, by the RAN entity to schedule subsequent transmissions of application data.

In this case, the at least one resilience parameter is derived from the tolerance of the application to consecutive transmission failures (i.e., is based on this tolerance), and indicates a treatment to be applied, upon a transmission failure of a packet, to further packets of transmitted application data, e.g., during the ST.

In an implementation of the first aspect, the plurality of robustness levels comprises a plurality of target Packet Error Rates (PERs).

In particular, a plurality of PERs are indicated, which are to be applied consecutively to further transmissions (packets) of application data, e.g., during the ST of the application or the translated version of the ST of the application. For instance, the shorter the remaining ST of the application is, the lower the target PER may be for the next transmission of application data.

In an implementation of the first aspect, the information is included in a Qos characteristic of a QoS flow.

In an implementation of the first aspect, the information is included in a Protocol Data Unit (PDU) session configuration.

In an implementation of the first aspect, the RAN entity is further configured to provide the information and/or the at least one resilience parameter to a UE, and/or configure a survival time counter for the application at the UE based on the at least one resilience parameter.

The UE can thus set up the ST counter, and may also apply a QoS treatment based on the received resilience parameter.

In an implementation of the first aspect, the RAN entity is further configured to, if a transmission failure occurs in a semi-persistently scheduled (SPS) transmission of application data to and/or from a UE, provide control information to the UE, wherein the control information comprises a dynamic resource allocation to override or extend a configured resource allocation for a subsequent SPS transmission of application data to and/or from the UE, wherein the dynamic resource allocation provides a higher redundancy for the subsequent transmission than the configured resource allocation.

The subsequent SPS transmission may in particular be the next SPS transmission. The RAN entity of the first aspect is thus able to increase a redundancy and thus a robustness for the next transmission of application data, in order to reduce the chances of a downtime of the application. Higher redundancy provides higher robustness to a transmission. The RAN entity is thus able to implement a QoS treatment even for critical services and applications.

In an implementation of the first aspect, the RAN entity is further configured to determine the dynamic resource allocation based on the at least one resilience parameter.

That means, the robustness of the subsequent, e.g., the next, transmission can be adapted based on the tolerance of the application to consecutive transmission failures. For instance, if the next transmission is critical (e.g., in case the application does not tolerate another transmission failure) the maximum robustness (redundancy) can be applied.

In an implementation of the first aspect, the dynamic resource allocation includes at least one of: a downlink (DL) assignment, an uplink (UL) grant, a sidelink (SL) grant.

That is, the QoS treatment applied by the RAN entity works for DL, UL and SL transmission of application data.

In an implementation of the first aspect, the RAN entity is further configured to detect the transmission failure, and/or receive feedback from a UE indicating the transmission failure.

In an implementation of the first aspect, the dynamic resource allocation provides the higher redundancy for the subsequent transmission by at least one of: increasing a number of resources for the subsequent transmission, increasing a number of retransmissions for the subsequent transmission, increasing a number of antennas to be used for the subsequent transmission, adapting a Modulation and Coding Scheme (MCS) for the subsequent transmission, increasing a transmission power for the subsequent transmission.

In an implementation of the first aspect, the RAN entity is a UE.

A second aspect of the disclosure provides a UE configured to, if a transmission failure occurs in a SPS transmission of application data to and/or from the UE, receive control information, wherein the control information comprises a dynamic resource allocation to override or extend a configured resource allocation for a subsequent SPS transmission of application data to and/or from the UE, wherein the dynamic resource allocation provides a higher redundancy for the subsequent transmission than the configured resource allocation.

The subsequent SPS transmission can in particular be the next transmission. The UE of the second aspect is thus able to increase a redundancy and thus a robustness for the next transmission of application data, in order to reduce the chances of a downtime of the application. Higher redundancy provides higher robustness to a transmission. The UE is thus able to implement a QoS treatment even for critical services and applications.

In an implementation of the second aspect, the dynamic resource allocation includes at least one of: a downlink assignment, an uplink grant, a sidelink grant.

In an implementation of the second aspect, the dynamic resource allocation provides the higher redundancy for the subsequent transmission by at least one of: increasing a number of resources for the subsequent transmission, increasing a number of retransmissions for the subsequent transmission, increasing a number of antennas to be used for the subsequent transmission, adapting a MCS for the subsequent transmission, increasing a transmission power for the subsequent transmission.

In an implementation of the second aspect, the UE is further configured to receive information indicating at least one resilience parameter of an application from a RAN entity, wherein the at least one resilience parameter is based on a tolerance of the application to transmission failures of application data, in particular consecutive transmission failures, and set up a survival time counter for the application based on the information and/or the at least one resilience parameter.

In this way, the UE of the second aspect is made aware of the tolerance of the application to transmission failures, in particular the at least one resilience parameter indicating said tolerance. The at least one resilience parameter may be a maximum tolerable number of transmission failures or may be a ST of the application.

In an implementation of the second aspect, the UE is further configured to report Channel State Information (CSI) to the RAN entity in case of a transmission failure of application data.

In an implementation of the second aspect, the UE is further configured to report the CSI, in particular determine a content of the CSI, based on the state of the survival time counter.

A third aspect of the disclosure provides a method performed by a RAN entity, wherein the method comprises receiving information indicating at least one resilience parameter of an application, from a control entity, another RAN entity, and/or a UE, wherein the at least one resilience parameter is based on a tolerance of the application to transmission failures of application data, in particular consecutive transmission failures.

The method of the third aspect may have implementations according to the implementations of the RAN entity of the first aspect. Accordingly, the method of the third aspect and its implementations achieve the same advantages and effects as the RAN entity of the first aspect and its respective implementations.

A fourth aspect of the disclosure provides a method performed by a UE, wherein the method comprises, if a transmission failure occurs in a SPS transmission of application data to and/or from the UE, receiving control information, wherein the control information comprises a dynamic resource allocation to override or extend a configured resource allocation for a subsequent SPS transmission of application data to and/or from the UE, wherein the dynamic resource allocation provides a higher redundancy for the subsequent transmission than the configured resource allocation.

The method of the fourth aspect may have implementations according to the implementations of the UE of the second aspect. Accordingly, the method of the fourth aspect and its implementations achieve the same advantages and effects as the UE of the second aspect and its respective implementations.

A fifth aspect of the disclosure provides a UE configured to receive information indicating at least one resilience parameter of an application from a RAN entity, wherein the at least one resilience parameter is based on a tolerance of the application to transmission failures of application data, in particular consecutive transmission failures, and to set up a survival time counter for the application based on the information and/or the at least one resilience parameter.

The UE of the fifth aspect is made aware of the tolerance of the application to transmission failures, in particular the at least one resilience parameter indicating said tolerance. The at least one resilience parameter may be a maximum tolerable number of transmission failures or may be a ST of the application. The UE of the fifth aspect can accordingly implement a QoS treatment based on the at least one resilience parameter.

In an implementation of the fifth aspect, the information comprises the at least one resilience parameter, or the information identifies the at least one resilience parameter, which is configured at the UE.

In an implementation of the fifth aspect, the resilience parameter indicates a maximum tolerable number of consecutive transmission failures, or the resilience parameter indicates a survival time (ST) of the application in case of one or more transmission failures.

In an implementation of the fifth aspect, the resilience parameter indicates a plurality of robustness levels to be used, in particular sequentially, by the UE to schedule subsequent transmissions of application data.

In an implementation of the fifth aspect, the plurality of robustness levels comprises a plurality of target PER.

In an implementation of the fifth aspect, the information is included in a QoS characteristic of a QoS flow.

In an implementation of the fifth aspect, the information is included in a Protocol Data Unit (PDU) session configuration.

A sixth aspect of the disclosure provides a RAN entity configured to, if a transmission failure occurs in a SPS transmission of application data to and/or from a UE, provide control information to the UE, wherein the control information comprises a dynamic resource allocation to override or extend a configured resource allocation for a subsequent SPS transmission of application data to and/or from the UE, wherein the dynamic resource allocation provides a higher redundancy for the subsequent transmission than the configured resource allocation.

The subsequent SPS transmission may in particular be the next SPS transmission. The RAN entity of the sixth aspect is able to increase a redundancy and thus a robustness for the next transmission of application data, in order to reduce the chances of a downtime of the application. Higher redundancy provides higher robustness to a transmission. The RAN entity is thus able to implement a QoS treatment even for critical services and applications.

In an implementation of the sixth aspect, the dynamic resource allocation provides the higher redundancy for the subsequent transmission by at least one of: increasing a number of resources for the subsequent transmission, increasing a number of retransmissions for the subsequent transmission, increasing a number of antennas to be used for the subsequent transmission, adapting a MCS for the subsequent transmission, increasing a transmission power for the subsequent transmission.

In an implementation of the sixth aspect, the RAN entity is further configured to receive information indicating at least one resilience parameter of an application, from a control entity, another RAN entity, and/or a UE, wherein the at least one resilience parameter is based on a tolerance of the application to transmission failures of application data, in particular consecutive transmission failures.

In an implementation of the sixth aspect, the RAN entity is further configured to determine the dynamic resource allocation based on at least one resilience parameter.

In an implementation of the sixth aspect, the dynamic resource allocation includes at least one of: a downlink assignment, an uplink grant, a sidelink grant.

In an implementation of the sixth aspect, the RAN entity is further configured to detect the transmission failure, and/or receive feedback from a UE indicating the transmission failure.

In an implementation of the sixth aspect, the RAN entity is a UE.

A seventh aspect of the disclosure provides a method performed by a RAN entity, the method comprising, if a transmission failure occurs in a SPS transmission of application data to and/or from a UE, providing control information to the UE, wherein the control information comprises a dynamic resource allocation to override or extend a configured resource allocation for a subsequent SPS transmission of application data to and/or from the UE, wherein the dynamic resource allocation provides a higher redundancy for the subsequent transmission than the configured resource allocation.

The method of the seventh aspect may have implementations according to the implementations of the RAN entity of the sixth aspect. Accordingly, the method of the seventh aspect and its implementations achieve the same advantages and effects as the RAN entity of the sixth aspect and its respective implementations.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, these methods and functionalities can be implemented in respective software or hardware elements, or any kind of combination thereof.

BRIEF DESCRIPTION OF DRAWINGS

The above described aspects and implementations of the present disclosure will be explained in the following description of specific embodiments in relation to the enclosed drawings, in which

FIG. 2 shows an example extension of QoS characteristics for supporting ST-relevant services and applications, wherein ST and ERS may be utilized.

FIG. 17 shows a method according to an embodiment of the invention.

FIG. 18 shows a method according to an embodiment of the disclosure.

DETAILED DESCRIPTION OF EMBODIMENTS

Embodiments of the disclosure may be implemented by introducing resilience parameters indicating the tolerance of the application to consecutive packet errors (e.g., based on its survival time) to the QoS framework and/or realizing in the RAN an adaptive reliability scheme based on the tolerance of the application to consecutive packet errors (e.g., based on its survival time).

As a result, the spectral efficiency and/or system capacity of the 5GS can be increased, e.g., by avoiding overprovisioning of RAN resources to support mission-critical services.

Figure 1:
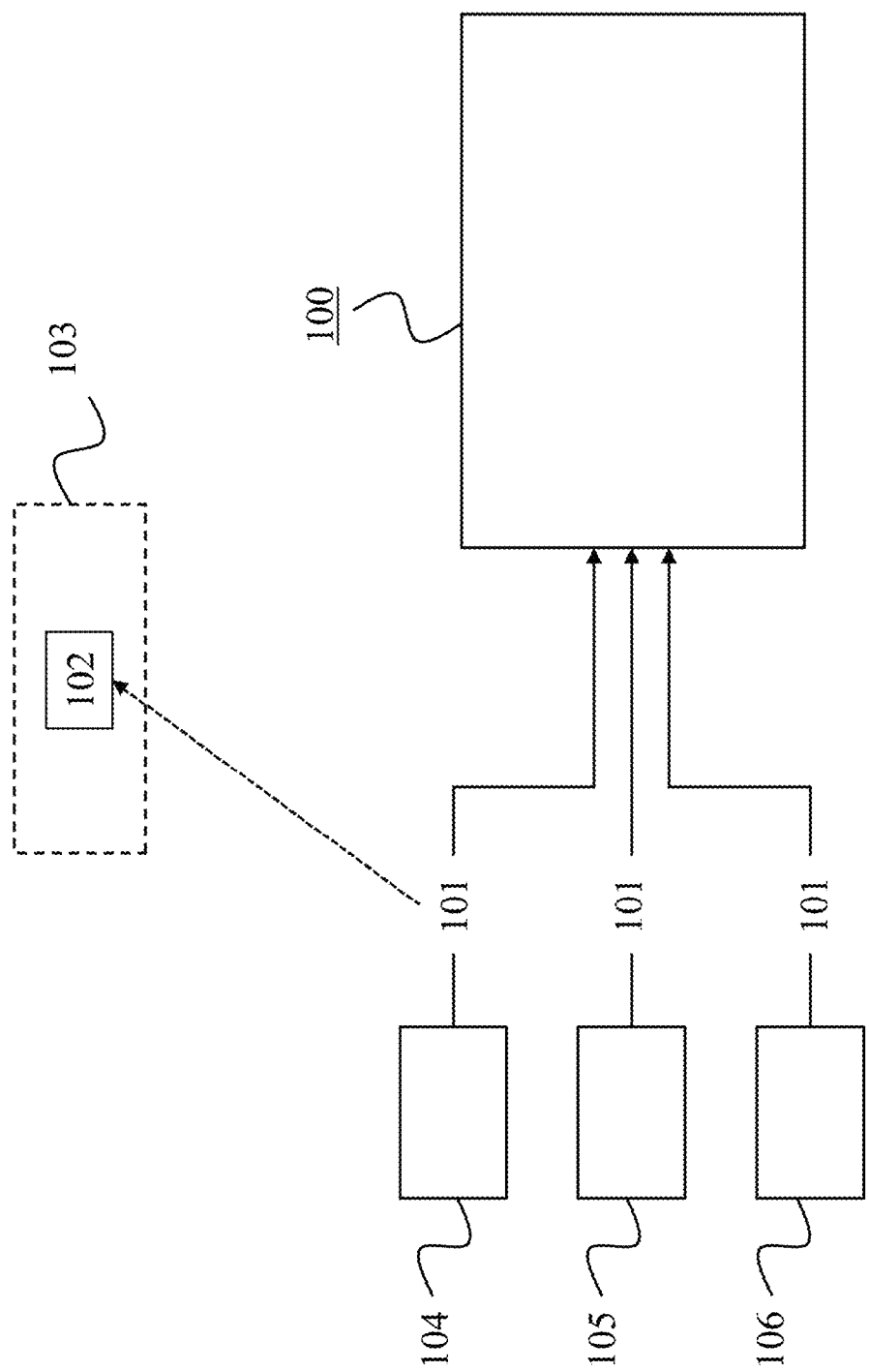
FIG. 1 shows a RAN entity according to an embodiment of the disclosure.

FIG. 1 shows a RAN entity 100 according to an embodiment of the disclosure. The RAN entity 100 may be any network entity located in the RAN, e.g., of a 5GS. For instance, the RAN entity 100 may be a base station, in particular a gNB. The RAN entity 100 may also be an integrated access backhaul (IAB) node, or a central unit (CU) or a distributed unit (DU) of a disaggregated 5G access node, a control plane (CP) or user plane (UP) of an access node. The RAN entity 100, however, may also be a UE.

The RAN entity 100 may comprise processing circuitry (not shown) configured to perform, conduct or initiate various operations of the device 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the RAN entity 100 to perform, conduct or initiate the operations or methods described herein.

The RAN entity 100 is configured to receive information 101, which indicates at least one resilience parameter 102 of an application 103. The information 101 may be received by the RAN entity 100 from a control entity 104, e.g., from a CN entity, from another RAN entity 105, and/or from a UE 106. The at least one resilience parameter 102 is based on a tolerance of the application 103 to transmission failures of application data, in particular consecutive transmission failures. This means that the at least one resilience parameter 102 may indicate (directly) the tolerance of the application 103 to the transmission failures, or may be derived from (depend on) the tolerance of the application 103 to the transmission failures.

For instance, the at least one resilience parameter 102 may indicate a maximum tolerable number of consecutive transmission failures, and/or may indicate a ST 201 of the application 103 in case of one or more transmission failures. The at least one resilience parameter 102 may also include or be the maximum tolerable number of consecutive transmission failures and/or the ST of the application 103. In this case, it directly indicates the tolerance of the application 103 to the transmission failures. The at least one resilience parameter 102 may also indicate a plurality of robustness levels 401 (see, e.g., FIG. 4) to be used, in particular sequentially, by the RAN entity 100 to schedule subsequent transmissions of application data. The at least one resilience parameter 102 may also include or be the robustness levels 401. In this case, it is derived from the tolerance of the application 103 to the transmission failures.

FIG. 2 shows an exemplary QoS enhancement, in order to support a RAN awareness (by making aware at least the RAN entity 100 of FIG. 1) of the tolerance of the application 103 to the transmission failures (reflected by the at least one resilience parameter 102). The RAN awareness to particularly the ST of the application 103 is exemplarily described below.

RAN treatment of arriving packets is conventionally conducted packet-wise, and does not take into account the packet correlation due to, e.g., the ST. The packet treatment is performed based on the QoS profiles and the QoS characteristics included therein. In an embodiment, the QoS characteristics 200—as shown in FIG. 2—can be extended by the inclusion of the ST 201 (or other information 101 indicating a resilience parameter 102) into the QoS characteristics 200. That is, the information 101 may be included in the QoS characteristics 200.

Different interpretations of the ST 201 can be utilized. For example, $T_{survival}=N \times T_{cycle}$, where $T_{survival}$ is the ST 201, N is the number of tolerable consecutive packet errors and $T_{cycle}$ is the cycle time, which refers to the inter-arrival time or periodicity of a packet. The ST 201 can be also included as an absolute time depending on the service, e.g., $T_{survival}=1$ ms. Furthermore, the cycle time may be obtained or derived from the end-to-end (E2E) latency target, e.g., packet delay budget (PDB), information, for instance, the PDB is equal or smaller than the cycle time. Accordingly, the resilience parameter can be a function of the ST 201, i.e., it can be derived considering the ST 201, e.g., $x=f(T_{survival}; y)$ can be used as the resilience parameter, where y can be parameter obtained from the TSN traffic characteristics. An example can be $x=T_{survival}/T_{cycle}$, where x is the resilience parameter that can be communicated between network entities. The resilience parameter can be associated with a network slice, e.g., by means of a slice ID. A slice ID can be, e.g., single network slice selection assistance information (S-NSSAI). In such a case, the ST 201 may be pre-configured for that network slice or network slice instance.

By means of this mechanism, the RAN entity 100 (and thus generally the RAN) is made aware that the application 103 can survive a certain number of consecutive packet errors and/or packet losses. In such a case, the PER 202 of the QoS characteristics 200 can be interpreted as the Error Rate within the ST (i.e., ERS for short).

FIG. 2 shows an example implementation, wherein the ST 201 and the PER 202 are included as part of the QoS profile, here particularly as part of the QoS characteristics 200. When the ST 201 is non-zero, the PER 202 can be interpreted as the ERS. The ERS can be calculated in different ways. For instance, the ERS can indicate the target PER 202 that shall be reached by the application 103 or the service considering the duration of the ST 201. In such a case, the RAN, e.g., the RAN entity 100, can apply different PER targets to the sequential packet transmissions. An example implementation of the ERS is $ERS=\Pi_{n=0}^{N} p_n$ where $p_n$ is the PER target of the packets to be transmitted sequentially within the ST 201, and n is a packet order identifier. Here, the multiplication of $p_n$ assumes that packets undergo independent radio channel conditions. As the channel conditions may be correlated over time, e.g., due to an obstacle shadowing the receiver or transmitter, a correlation of the packet transmission can be taken into account while calculating $p_n$. There can be different assignments of the $p_n$, e.g., depending on the load and resource situation of the RAN. For instance, in case of a high load, the first packet among N possible packets within the ST 201 may be first transmitted with a lower reliability target, e.g., a lower PER target.

Figure 3:
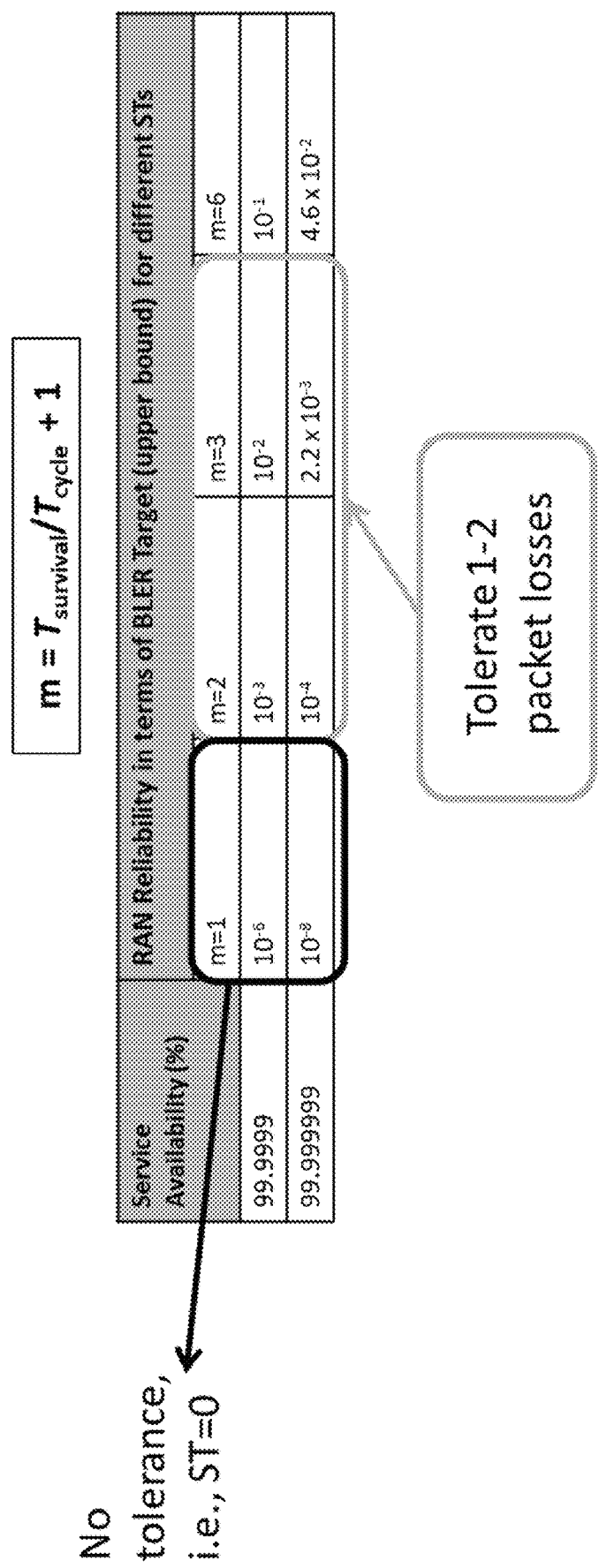
FIG. 3 shows an example of different RAN reliability targets depending on the service availability requirement (assuming packet errors are statistically independent).

FIG. 3 exemplifies different reliability targets depending on the service availability requirement. The number m of consecutive packet errors that causes the application 103 to declare the communication service unavailable is given by $m=N+1=T_{survival}/T_{cycle}+1$. When m=1 ($T_{survival}=0$), the application 103 does not tolerate any packet losses (i.e., a single packet error will cause the application to declare the communication service unavailable). In this case, for a service availability A of 99.9999%, the RAN reliability target in terms of PER becomes $1-A=10^{-6}$. In contrast, if m=2, each $p_n$ can be set to $10^{-3}$ (i.e., $p_0=p_1=10^{-3}$) such that $ERS=p_0 \times p_1=10^{-6}$.

The aforementioned strategy, as illustrated in FIG. 3, can also be modified to improve the resource utilization efficiency. With the RAN awareness of the at least one resilience parameter 102, e.g., the ST 201, when a packet error occurs, the RAN, e.g., the RAN entity 100, may immediately readapt itself according to the changing channel and interference conditions to enhance the robustness of the following packet transmission within the ST 201. The strategy can be based on the service availability (A) requirement, which is coupled with the PER targets. The service availability can be expressed as $A=1-\Pi_{n=0}^{N} p_n$, $p_0 > p_1 > \ldots > p_N$. For N>0, the RAN may relax the reliability target, if the previous transmission succeeded, e.g., using a higher MCS (e.g., going from 16QAM to 64QAM) and/or higher spatial multiplexing factor. Only when a packet error occurs, the RAN may schedule a more robust transmission to reduce the probability of a second error. With such an Error-Triggered Reliability (ETR) being implemented, the spectral efficiency and/or system capacity of the 5GS can be largely increased. For example, with a target service availability of 99.9999% and a ST 201 translating to 1 tolerable packet error (but not 2 consecutive packet errors), the reliability targets can be configured as follows:

Reliability target if previous transmission succeeded: $p_0=10^{-2}$

Reliability target triggered by first packet error: $p_1=10^{-4}$

In this example, 99% of the running time the RAN operates with higher spectral efficiency (i.e., with a reliability target of $p_0=10^{-2}$). This is much more efficient than operating 100% of the running time with lower spectral efficiency (i.e., with a reliability target of $p_0=p_1=10^{-3}$ or even $p_0=10^{-6}$).

Figure 4:
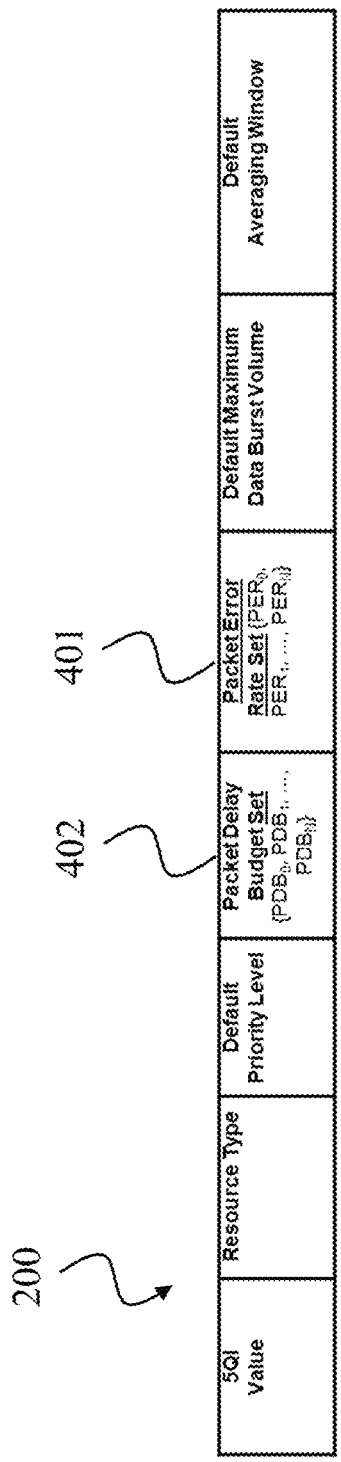
FIG. 4 shows an example extension of the QoS characteristics for supporting ST-relevant services and applications, wherein a PER per packet is introduced based on the ST. A PDB per packet can also be introduced, or the PDB can be fixed for each packet, i.e., can be a single value for all packets or a set of values for a group of packets.

In another implementation example, the ST 201 may be implicitly captured by the QOS characteristics 200, as shown in FIG. 4. In this case, the PER target 401 for each packet or for a group of packets, e.g., within the ST 201, is introduced into the QoS characteristics 200. For instance, if the previous packet transmission succeeded, the RAN, e.g., the RAN entity 100, can apply a PER target $p_0=PER_0$. If this packet is lost (e.g., not correctly decoded by the receiver or the PDB 402 is exceeded), the RAN, e.g., the RAN entity 100, can apply a PER target $p_1=PER_1$ for the next packet, and so on, up to the Nth packet. As the PER 401 can be coupled with a PDB 402, for each $PER_n$ an associated $PDB_n$ can also be introduced into the QoS characteristics 200 (as exemplarily shown in FIG. 4). As mentioned before, the PER 401 or the PDB 402 targets can be assigned to one or more packets, e.g., a group or burst of packets. In different implementation options, the ST 201 can be specific to DL, UL or SL, e.g., a ST 201a can be defined for DL communication (referred to as ST-DL), a ST 201b can be defined for UL communication (referred to as ST-UL), and/or a ST 201c can be defined for SL communication (referred to as ST-SL). Such an assignment may be needed for certain services or applications 103. Moreover, for different services or applications 103, if such values, e.g., the ST 201, are different, then different QoS profiles along with different QoS characteristics 200 may be defined.

In the previous implementation examples, the ST 201 and/or ST-related information 401 can be sent, as the information 101 or included in the information 101, from the CN to the RAN entity 101, e.g., via the CN-RAN interface (e.g., the N2 interface between Access and Mobility Management Function (AMF) and NG-RAN, in accordance with N2 signaling procedures).

Figure 5:
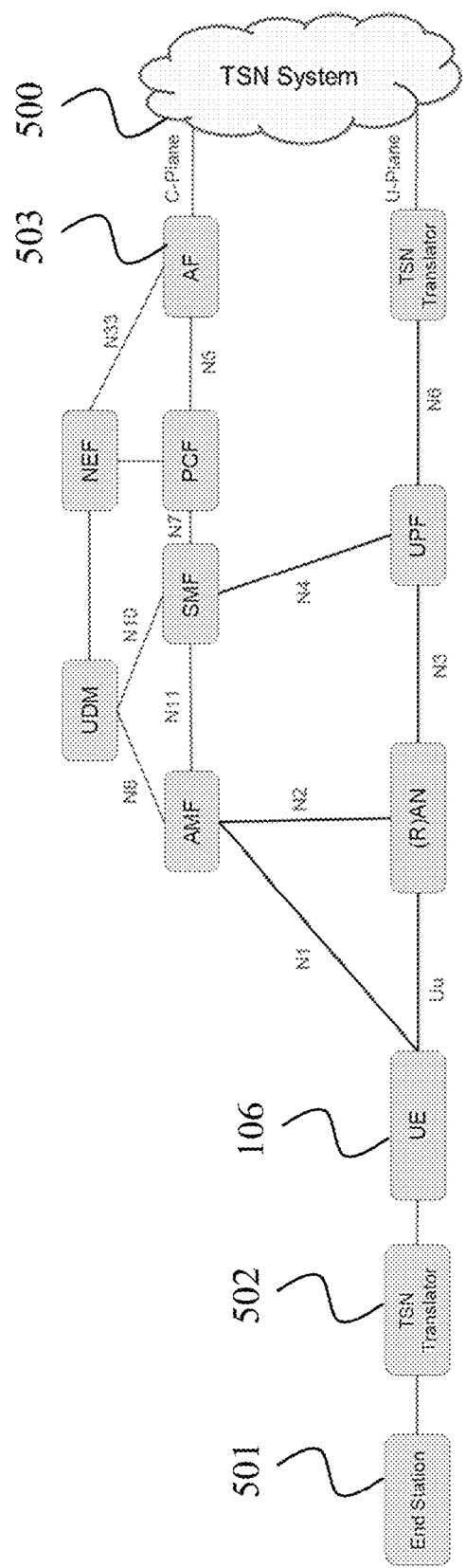
FIG. 5 shows an example integration of a 5GS with a TSN system.

FIG. 5 shows an example implementation, wherein the 5GS components and their extensions are integrated with a Time-Sensitive Networking (TSN) system 500, and wherein the TSN system 500 is connected to an end station 501. In such an implementation, TSN translators 502 may be used to map TSN-specific features, e.g., packets, to 5GS-specific features. The TSN translators 502 can be utilized both for the control plane (C-Plane, CP) and user plane (U-Plane, UP). The AF 503 can include the functionality of a TSN translator 502 for the C-Plane. In such a case, the AF 503 may be the interface, e.g., to determine the 5GS requirements based on the TSN communication needs.

Figure 6:
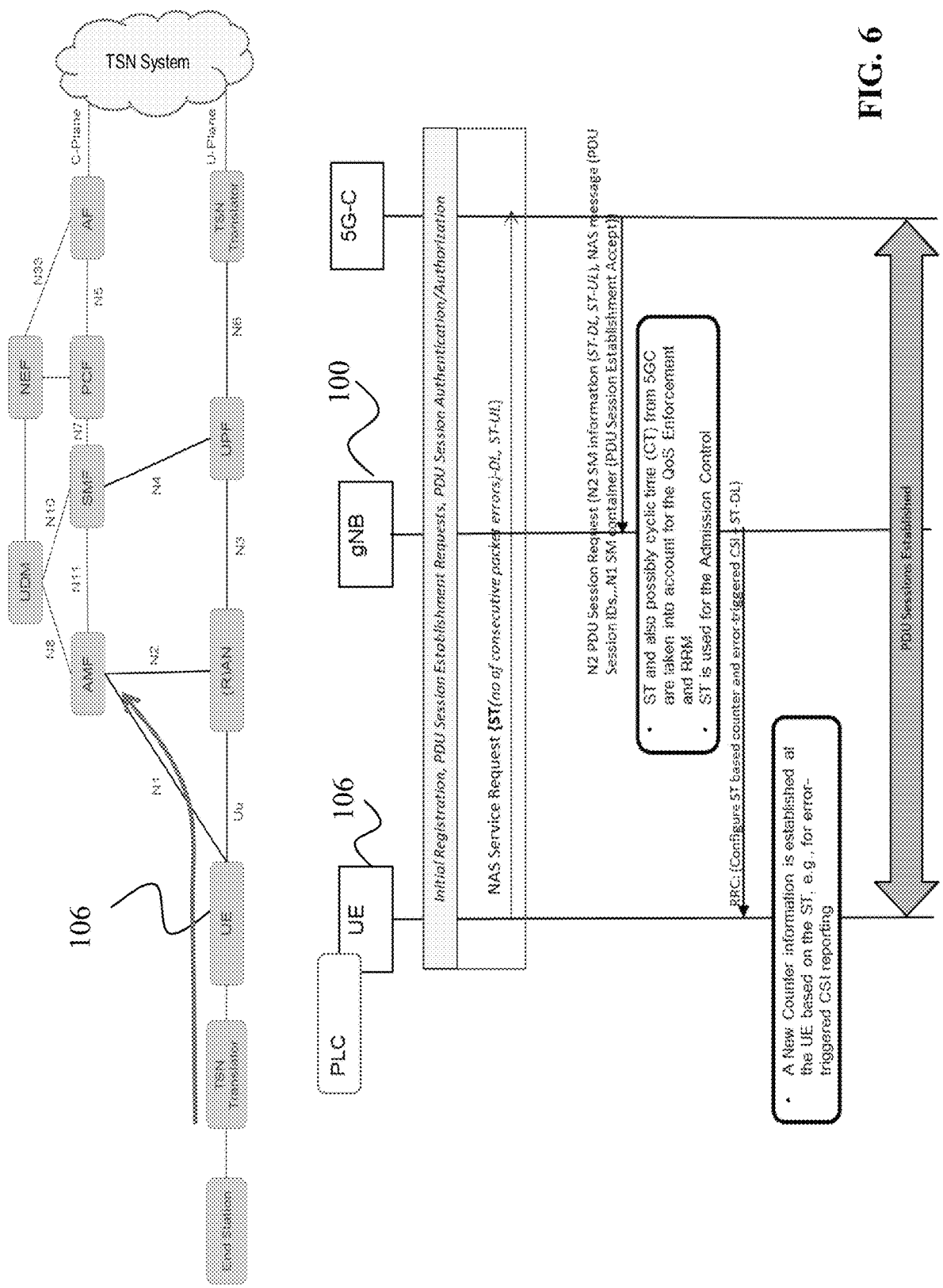
FIG. 6 illustrates RAN awareness of the ST, wherein the ST information is obtained via an end device and UE.

FIG. 6 presents an embodiment, in which the information 101 indicating the at least one resilience parameter 102, e.g., the ST 201, is obtained via UE 106. The arrow at the top of FIG. 6 indicates the flow of such information 101 in the 5GS, which can be sent by the UE 106 using the N1 and/or Uu interface. The message sequence chart at the bottom of FIG. 6 illustrates an example showing how such information 101 can be communicated to the CN, and how the CN can provide this information 101 to the RAN entity 100 and UE 106. An example case where the information 101 (e.g., including ST 201, e.g., ST-DL, ST-UL and/or ST-SL) is obtained via the UE 106 is the case where a Programmable Logic Controller (PLC) is co-located on the device side. In addition to the ST 201, TSN information on the TSN traffic characteristics, such as cycle time, jitter or delay requirements may also be included in the information 101. Such TSN information may be included in the Non-Access Stratum (NAS) procedures and thus the N1 interface may be used. Based on the TSN traffic characteristics, including, e.g., the ST 201, the CN (here, 5G Core, 5GC) can update the QoS profiles, such as the QoS characteristics 200, and/or provide the relevant information 101 to the RAN and/or UE via N2 and/or N1 signaling. If the update is only on the QoS profiles, by means of the QFI and 5QI, RAN can determine the QoS requirements of the associated QOS flows. The information 101 indicating, e.g., the ST 201 can be utilized by the RAN, e.g., by the RAN entity 100, for QoS enforcement, e.g., by applying appropriate Radio Resource Management (RRM).

If the ST 201 is to be sent to the UE 106, NAS protocols can be used. In this example, Radio Resource Control (RRC) can configure an ST-based counter on the UE side and can also configure error-triggered Channel State Information (CSI) reporting based on the ST, e.g., ST-DL. Based on the RRC configuration, a new counter can be established at the UE 106, which can be used for, e.g., error-triggered CSI reporting.

If the communication takes place between two UEs 106, the communication on the SL can be configured based on the ST-SL, where ST-SL may be equivalent to any of the flow directions, e.g., ST-SL=ST-UL or ST-SL=ST-DL.

The information on the ST 201 can be used by the RAN, e.g., by the RAN entity 100, for admission control. For example, a PDU session with relaxed ST 201 (i.e., longer ST) may be admitted while a strict ST 201 may be rejected due to resource overload.

The ST 201 can be provided as UE-specific information. This can be the case, e.g., when the UE 106 or the TSN system 500 attached to the UE 106, has a specific service or application 103. In such a case, the ST 210 may be included as part of UE registration.

Figure 7:
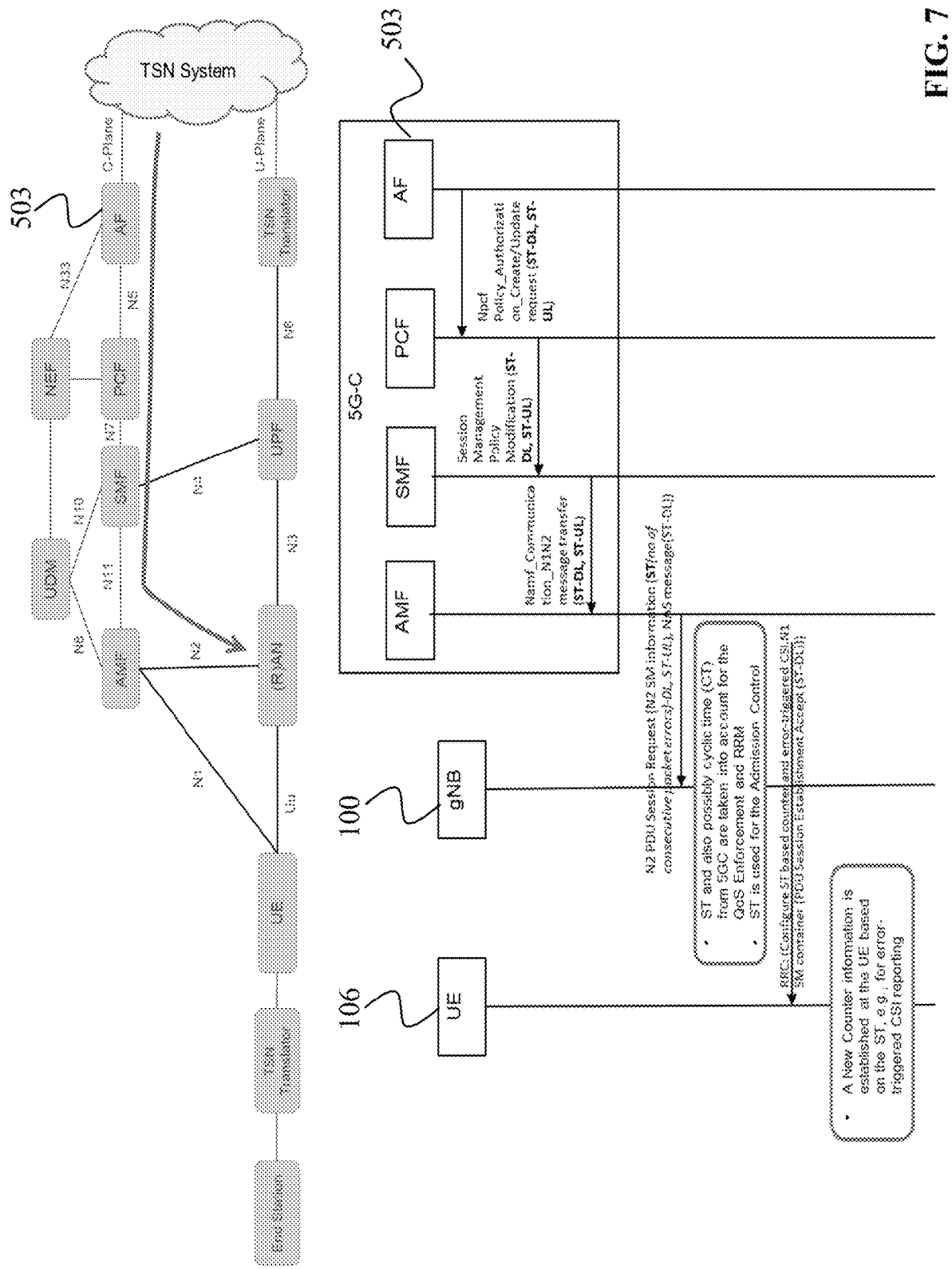
FIG. 7 illustrates RAN awareness of the ST, wherein the ST information is obtained via an Application Function (AF).

FIG. 7 presents an embodiment where the information 101, e.g., indicating the ST 201, is obtained via the AF 503. The arrow at the top of FIG. 7 indicates the flow of such information 101 in the 5GS, which can be sent via the 5GC service-based interface. In this case, the information 101 can be sent from the AF 503 toward the AMF via policy control function (PCF) and SMF. The 5GC functions PCF and SMF may modify the message content. The message sequence chart at the bottom of FIG. 7 illustrates an example showing how such information 101 can be communicated to the CN, and within the CN, and how the CN can provide this information 101 to the RAN entity 101 and/or UE 106. An example case where the information 101 (e.g., including the ST 201, e.g., ST-DL, ST-UL and/or ST-SL) is obtained via the AF 503 is the case where a PLC is located in the TSN system 500 as indicated in FIG. 7.

Figure 8:
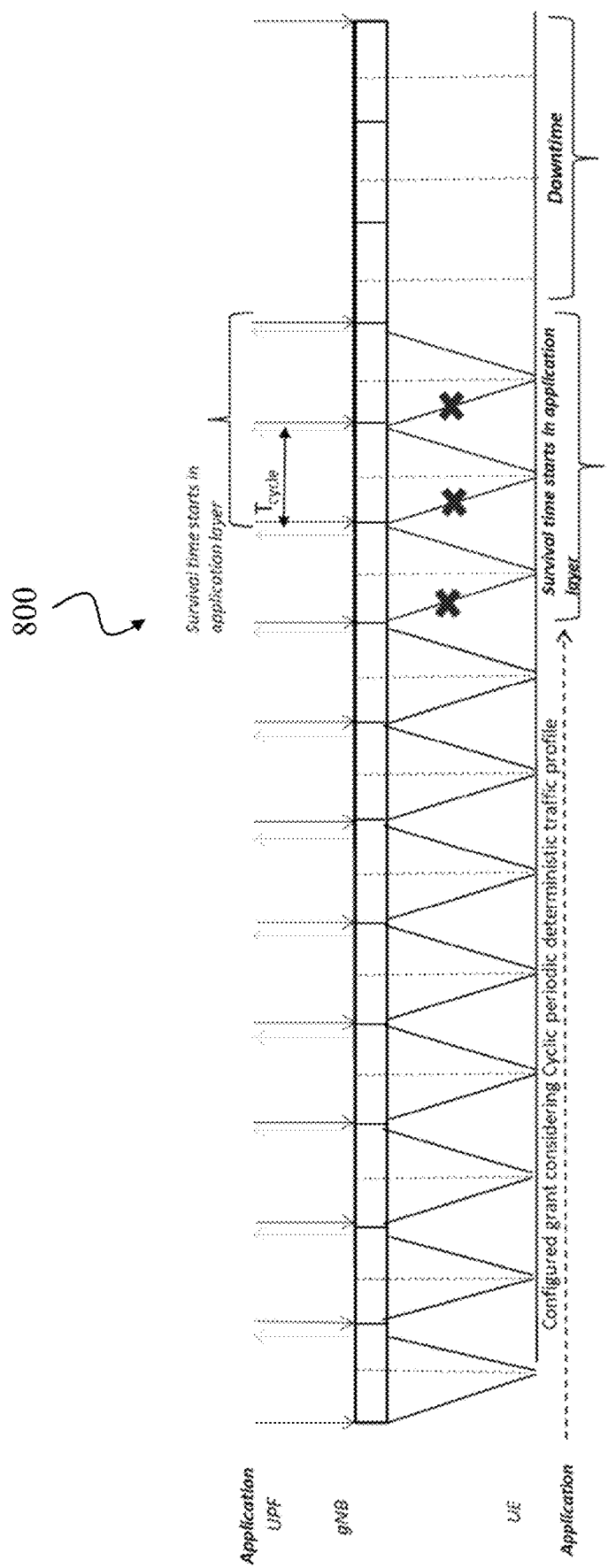
FIG. 8 illustrates the ST and a ST counter, after which a communication service becomes unavailable.

FIG. 8 shows an exemplary illustration of the concept of the ST 201, which may be indicated by the information 101 and may be the at least one resilience parameter 102. FIG. 8 also shows a ST counter 800, which may be configured for the application 103, e.g., at a UE 106, based on the at least one resilience parameter 102. FIG. 8 particularly shows that the ST counter 800 starts when an expected packet is not successfully received, e.g., due to jitter causing the PDB to be exceeded or if the packet could not be decoded successfully by the receiver. The downtime of the communication service is declared when the ST counter 800 expires. The ST counter 800 may run in the application layer, and may be transparent to the UE(s) 106 and the RAN layer, e.g., to the RAN entity 100.

Figure 9:
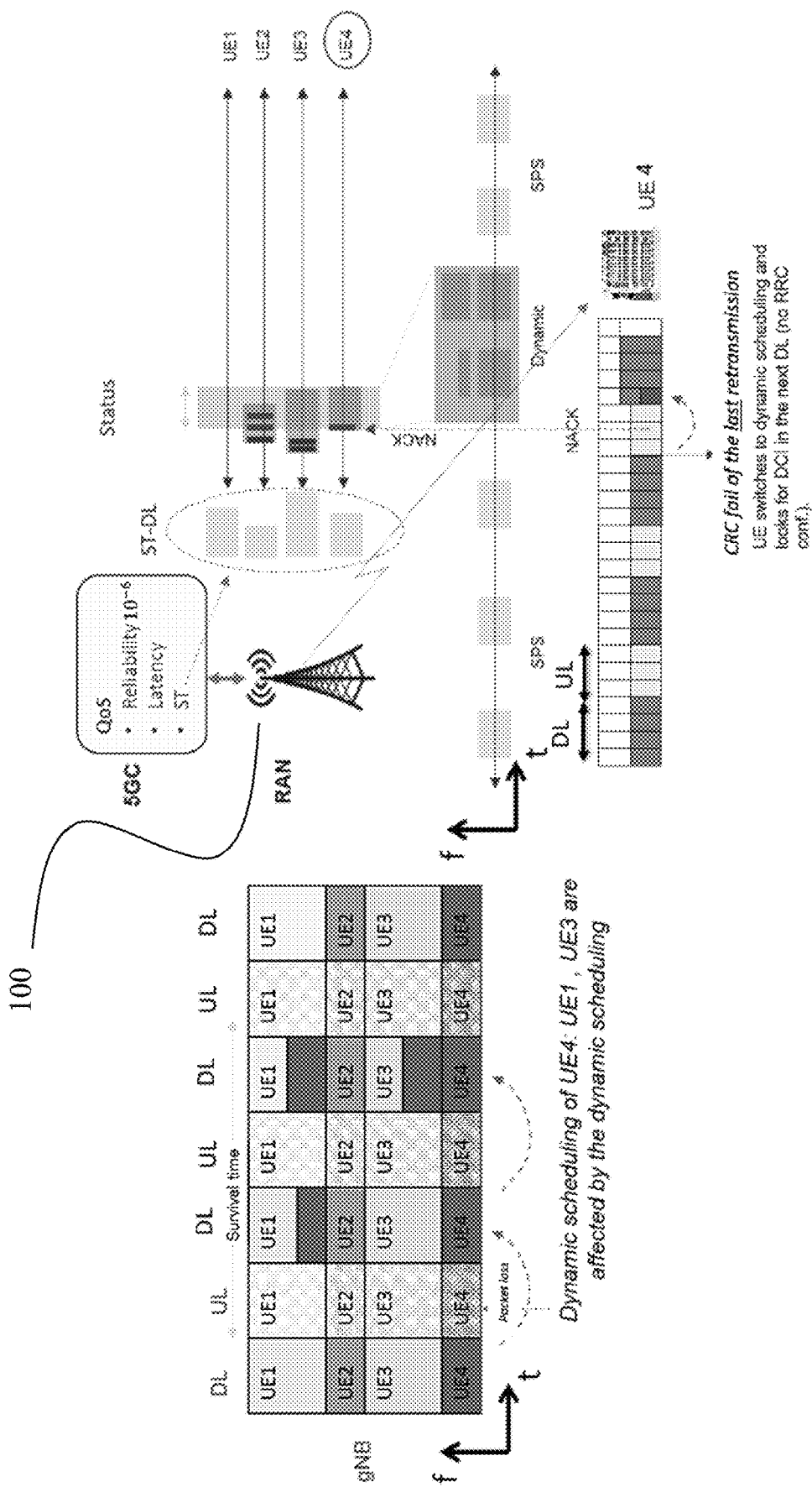
FIG. 9 illustrates a utilization of the ST for DL Radio Resource Management (RRM).

FIG. 9 shows an embodiment, in which the at least one resilience parameter 102, here exemplarily the ST 201, is used for QOS enforcement at the RAN entity 100, here at a gNB, for DL communication. In particular, the illustration on the right shows how UEs 106 with different ST 201 values are treated by the RAN entity 100, and how the resource allocation can take place. For illustration purposes, the resource allocation for a UE4 is used as an example. Here, the ST 201 can be specific to the DL flow direction, i.e., ST-DL.

At the gNB 100, when a packet loss indication is received from UE4 (e.g., NACK after performing all retransmissions, if there are retransmissions), the scheduler lists the UEs 106 with DL transmissions. The gNB 100 categorizes the UEs 106 based on traffic type—such as non-real-time (NRT) (e.g., TCP traffic), real-time (RT) for cyclic non-deterministic data, and isochronous real-time (IRT) for cyclic deterministic data with very low jitter—, ST-DL, cycle time, and failure state. The length of the bars under ST-DL indicate the duration of the ST 201 (e.g., UE3 has the longest ST 201, while UE2 has the shortest ST 201). Under the "status" mark, the number of packet losses are indicated by small bars. For instance, UE2 has 3 consecutive packet losses out of 4 tolerable consecutive packet losses (i.e., the ST 201 of UE2). Upon UE4 not receiving a packet correctly (i.e., packet loss), a NACK is sent to the gNB 100, and the gNB 100 can mark this, as illustrated in FIG. 9. Accordingly, the UEs 106 in ST state are categorized based on their respective deadlines. For example, the UEs 106 close to expiration of their ST 201. e.g., UE2, can be prioritized with respect to other UEs 106 that are not close to their ST expiration.

Here, the service priority can also be taken into account. The service priority can be indicated under the QoS characteristics 200 and/or QoS profiles. e.g., Allocation and Retention Priority (ARP). As TSN communication is typically periodic, the UEs 106 may be configured for Semi-Persistent Scheduling (SPS), as shown. After a packet loss (e.g., Cyclic Redundancy Check (CRC) failure of the last transmission of UE4). UE4 can be switched from SPS to dynamic scheduling. This can be performed by RRC configuration or via Downlink Control Information (DCI) transmission by the gNB 100. Such configuration may override the existing SPS allocation in the corresponding subframe and/or provide additional resources to the UE 106. The UE 106, here UE4, directly after the CRC failure of the last retransmission, can switch to the expected dynamic scheduling and look for DCI in the next DL subframe. This may have the benefit of reducing the search complexity at the UE 106. As shown on the left side of FIG. 9, after each packet loss. UE4 may be allocated different resources or configured with different resource configurations to increase the redundancy (and consequently the robustness) of a subsequent packet transmission. e.g., new MCS, increased number of resources, increased number of retransmissions, increased number of antennas, increased transmission power, etc. As the number of packet losses increases, the ST expiration deadline comes closer and the gNB 100 may adapt the resource configuration to increase the successful packet transmission chances. This can include, as illustrated, resource borrowing from the other UEs 106. e.g., that have longer ST 201 and not many packet losses relative to their ST 201.

This embodiment can also have the advantage of utilizing the ST 201 to adapt computational power per link. i.e., larger ST can imply less computational power for the first packets. Thus, the 5GS can support more URLLC links.

Figure 10:
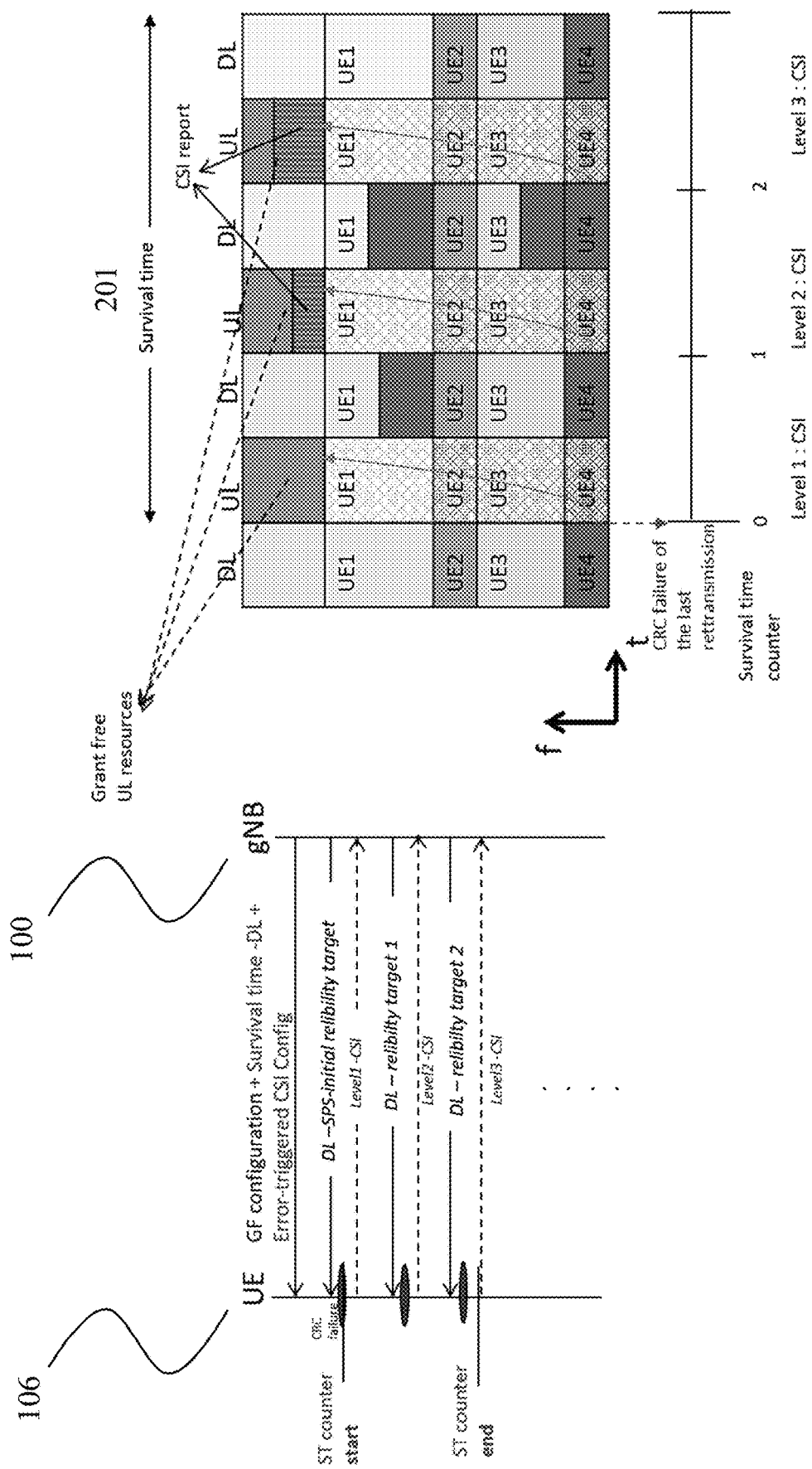
FIG. 10 illustrates error-triggered CSI reporting.

In FIG. 10, an embodiment of error-triggered CSI reporting is illustrated. After the first packet loss, the UE 106 can be pre-configured to report CSI, without the need for CSI configuration. This provides the advantage that the CSI reporting can be used for the resource allocation during a subsequent transmission, particularly the next transmission. e.g., considering the channel quality on the different chunks of the spectrum. The illustration on the left side of FIG. 10 shows the message sequence chart for the error-triggered CSI reporting, and the illustration on the right side of FIG. 10 shows an example resource allocation.

Here, the gNB 100 shares ST information with the UE 106, e.g., ST-DL. Directly after DL CRC failure of the last retransmission, the ST counter 800 starts at the UE 106. Based on the counter 800, the UE 106 triggers CSI reporting to assist the gNB 100 for proper scheduling. The UE 106 can report CSI on Grant-Free (GF) UL resources allocated by the gNB 100 via RRC. The level of detail of CSI information can depend on the ST counter 800. That is, the closer the ST expiration deadline, the more detailed the CSI report sent by the UE 106.

CSI levels may differ in terms of, e.g., channel quality information (CQI) resolution (wide band, sub-band, or even per Resource Element. RE) and number of extra parameters needed for scheduling. e.g., RSRP. RI. PMI, etc. With more detailed CSI feedback, more efficient scheduling can be applied.

Figure 11:
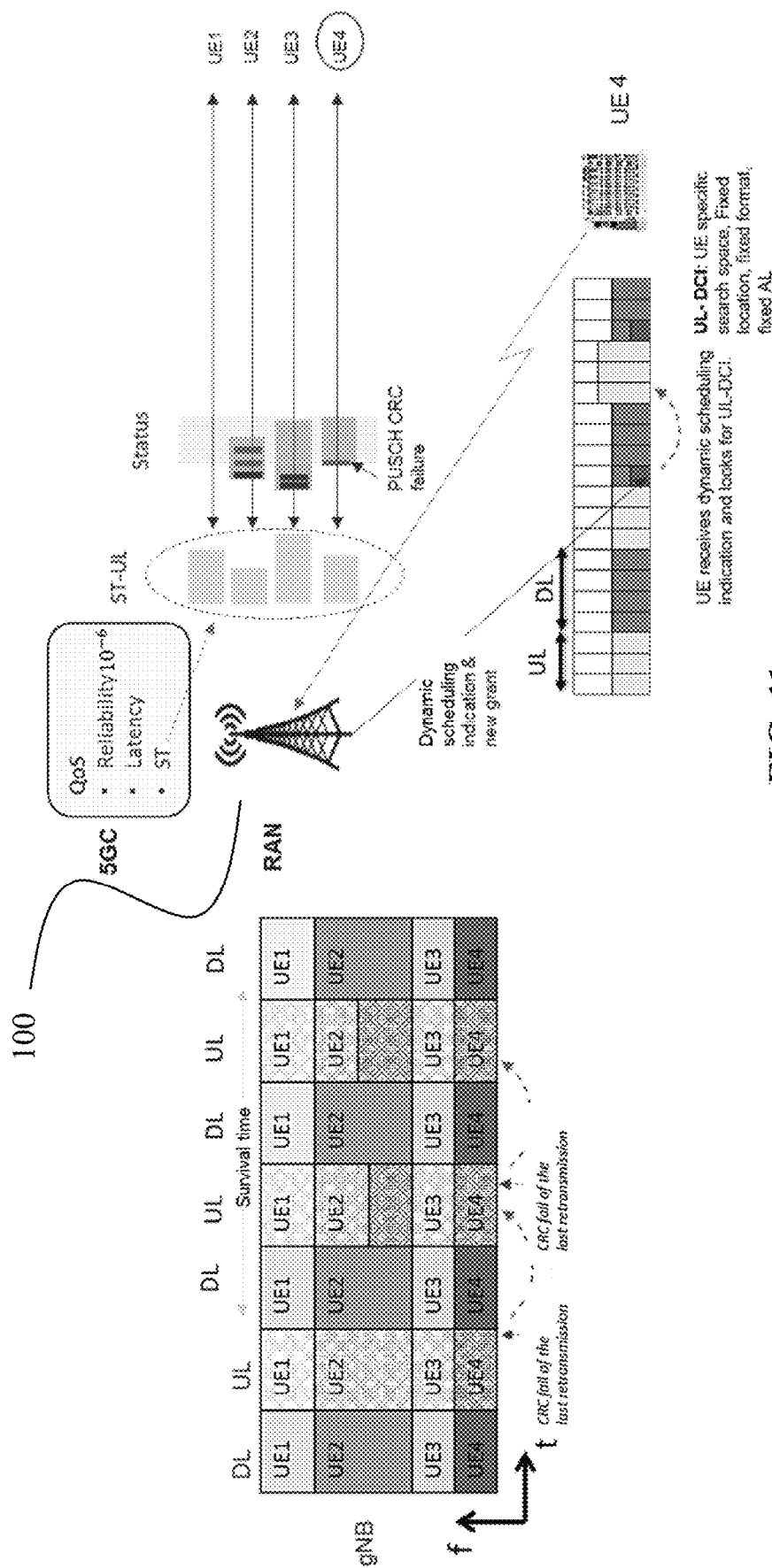
FIG. 11 illustrates a utilization of the ST for UL RRM.

FIG. 11 shows an embodiment, in which the ST 201 is used for QoS enforcement in the RAN for UL communication. In particular, the illustration on the right shows how UEs 106 with different ST values are treated, and how the resource allocation can take place. For illustration purposes, the resource allocation for UE4 is used as an example. Here, the ST 201 can be specific to the UL flow direction. i.e., ST-UL. At the gNB 100, when a packet loss indication is detected (e.g., Physical Uplink Shared Channel (PUSCH) CRC failure), the scheduler lists the UEs 106 with UL transmissions. The gNB 100 categorizes the UEs 106 based on traffic type (NRT, IRT, RT, etc.). ST-UL, cycle time, and failure state. The length of the bars under ST-UL indicate the duration of the ST 201 (e.g., UE3 has the longest ST 201, while UE2 has the shortest ST 201). Under the "status" mark, the number of packet losses are indicated by small bars. For instance. UE2 has 3 consecutive packet losses out of 4 tolerable consecutive packet losses (i.e., the ST of UE2) and UE1 has no packet losses. As TSN communication is typically periodic, the UEs 106 may be configured for SPS, as shown. Upon the packet from UE4 not being received correctly (i.e., packet loss), the gNB 100 can modify the resource allocation such that SPS may be switched to dynamic scheduling. Accordingly. UEs 106 in ST state are categorized based on their respective deadlines. For example, UEs 106 close to expiration of their ST (e.g., UE2) can be prioritized with respect to other UEs 106 that are not close to their ST expiration.

Here, the service priority can also be taken into account. The service priority can be indicated under the QoS characteristics 200 and/or QoS profiles. e.g., ARP. The new resource allocation configuration can be provided via an UL-DCI. A UE-specific search space can be used to reduce the complexity of the search as also indicated in the figure. Such resource configuration may override the existing SPS configuration and/or provide additional resources to the UE 106. In case of packet loss or packet losses within the ST 201, a UE 106 can be given more resources as shown on the left side of FIG. 10. As shown on the left side, after each packet loss. UE4 may be allocated with different resources or with different resource configurations to increase the redundancy (and consequently the robustness) of a subsequent packet transmission. e.g., new MCS, increased number of resources, increased number of retransmissions, increased number of antennas, increased transmission power, etc. As the number of packet losses increases, the ST expiration deadline comes closer and the gNB 100 may adapt the resource configuration to increase the successful packet transmission chances. This can include, as illustrated, resource borrowing from the other UEs 106, e.g., that have longer ST 201 and not many packet losses relative to their ST 201.

This embodiment can also have the advantage of utilizing ST 201 to adapt computational power per link. i.e., larger ST 201 can imply less computational power for the first packets. Thus, the 5GS can support more URLLC links.

In the aforementioned embodiments, further information can be provided on the TSN communication characteristics. For instance, the RAN. e.g., the RAN entity 100, can take into account the jitter information of the packets to estimate whether the next packet would arrive within the ST 201 or not. Considering the correlation of the packets such that a packet with jitter implies that the next packet may also come with a similar jitter, the RAN, e.g., the RAN entity, may determine whether the next packet may arrive on time. i.e., within the ST 201. If the estimation is that the next packet may not arrive within the ST 201, the RAN, e.g., the RAN entity 100, may increase the reliability of the current packet transmission to fulfill the ST requirement.

Figure 12:
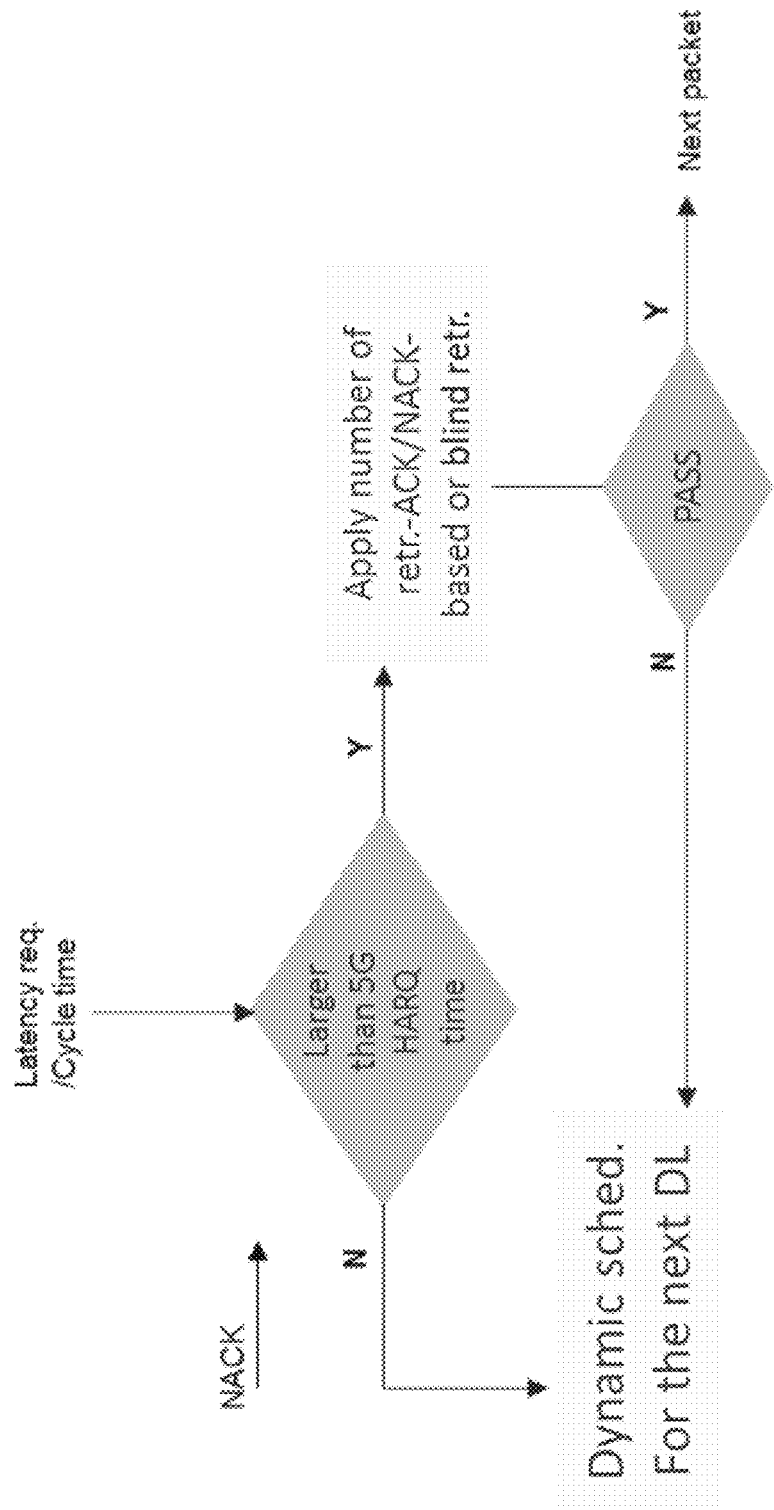
FIG. 12 illustrates adaptive reliability in case of possible re-transmissions.

FIG. 12 shows an embodiment on the adaptive reliability considering the ST 201 and possible retransmissions for a packet. In case of a packet loss, if the Hybrid Automatic Repeat Request (HARQ) time is shorter than the PDB. HARQ retransmission is applied. In case of a failure after the HARQ time elapsed, the next packet's reliability needs to be enhanced. As the SPS is typically applied to cyclic traffic, this requires switching to dynamic scheduling. Switching between SPS and dynamic scheduling needs to be fast (RRC configuration may take more time). Thus, informing the UE 106 about the new configuration via DCI can be a faster option. DCI may be always on. Another option can be sending a flag (e.g., fixed small-size DCI) to be decoded all the time as a first-stage DCI that gives information on whether DCI is on or off. After the packet is received correctly or ST 201 was elapsed, the resource allocation can switch back to SPS. The SPS after the dynamic scheduling can have the same configuration as before the dynamic scheduling or a different configuration, taking into account the information on the packet loss. Resetting the scheduling back to SPS after the survival time has elapsed may require the gNB 100 to store the initial SPS configuration, in order to avoid extra signaling.

The aforementioned embodiments can be adapted to different deployment architectures. For instance, if a disaggregated gNB 100 is deployed (e.g., gNB 100 is split into a central unit (CU) and distributed unit (DU), where there is an F1 interface between a CU and DU), the TSN communication characteristics (i.e., ST, cycle time, start of the packet transmission, etc.) can be communicated from the CU to the DU or DUs via F1 signaling, e.g., F1AP protocol. In case of the split of control plane and user plane, an E1 interface exists between the control plane and user plane. In such case, TSN communication characteristics can be communicated over the E1 interface. In case of master node (MN) and secondary node (SN) deployment, the information on the aforementioned TSN communication characteristics can be transmitted over the Xn interface between MN and SN. Packet duplication, e.g., Packet Data Convergence Protocol (PDCP) duplication, can be used to increase the reliability within the ST 201. For example, packet duplication may not be used for the first packet transmission; however, if the first packet is lost, packet duplication may be activated for the next packet transmission to fulfill the ST requirement.

In the following, embodiments are described, which may use the above embodiments fully or partially, and wherein some extensions are applied to new use cases.

Figure 13:
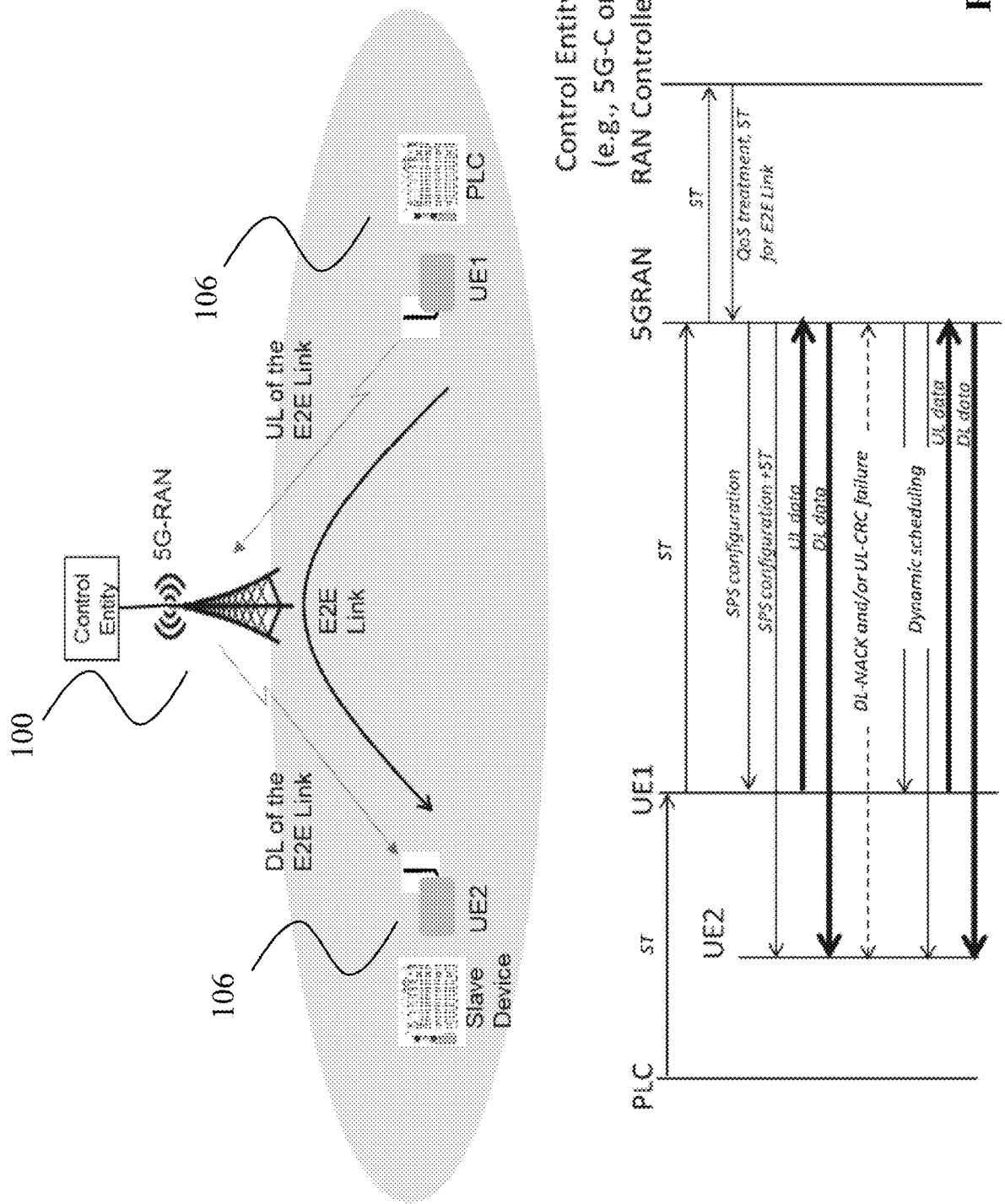
FIG. 13 shows a QoS treatment on the local path.

As shown in FIG. 13, a PLC may be at one UE 106 whereas a sensor/actuator may be at another UE 106. In such a case, which may be referred to as local path, local E2E path or local switch, the communication flow is from UE 1 to the RAN entity 100 and/or CN entity, e.g., UPF or local UPF, or a local path switch function, to the UE2 from the RAN entity 100. In this case, the ST 201 needs to be considered on the end-to-end (E2E) link comprising a UL part and a DL part. For instance, if the ST 201 is 5 ms (or, e.g., 5 consecutive packet losses when the packet inter-arrival time is 1 ms), this shall be considered on the communication flow from UE1 to the RAN entity 100 and then RAN entity 100 to the UE2 collectively, e.g., if 2 packets are lost on the communication link from UE1 to the RAN entity 100, the remaining ST 201 is 3 packets from RAN entity 100 to the UE2. Further, the information 101 on the ST 201 may be obtained via any of the aforementioned embodiments or via another control entity that may be deployed close to the RAN, e.g., at the edge or edge cloud. The control entity can be a RAN controller that communicates with the RAN entity 100, e.g., over a southbound interface (SoBI) or a standardized interface. The PLC can provide the QoS characteristics to UE1, e.g., ST and cycle time. A TSN translator may map this information to the 5GS requirements and provide it to UE1 and UE1 provides this information to the RAN entity 100 and/or the control entity 104.

Figure 14:
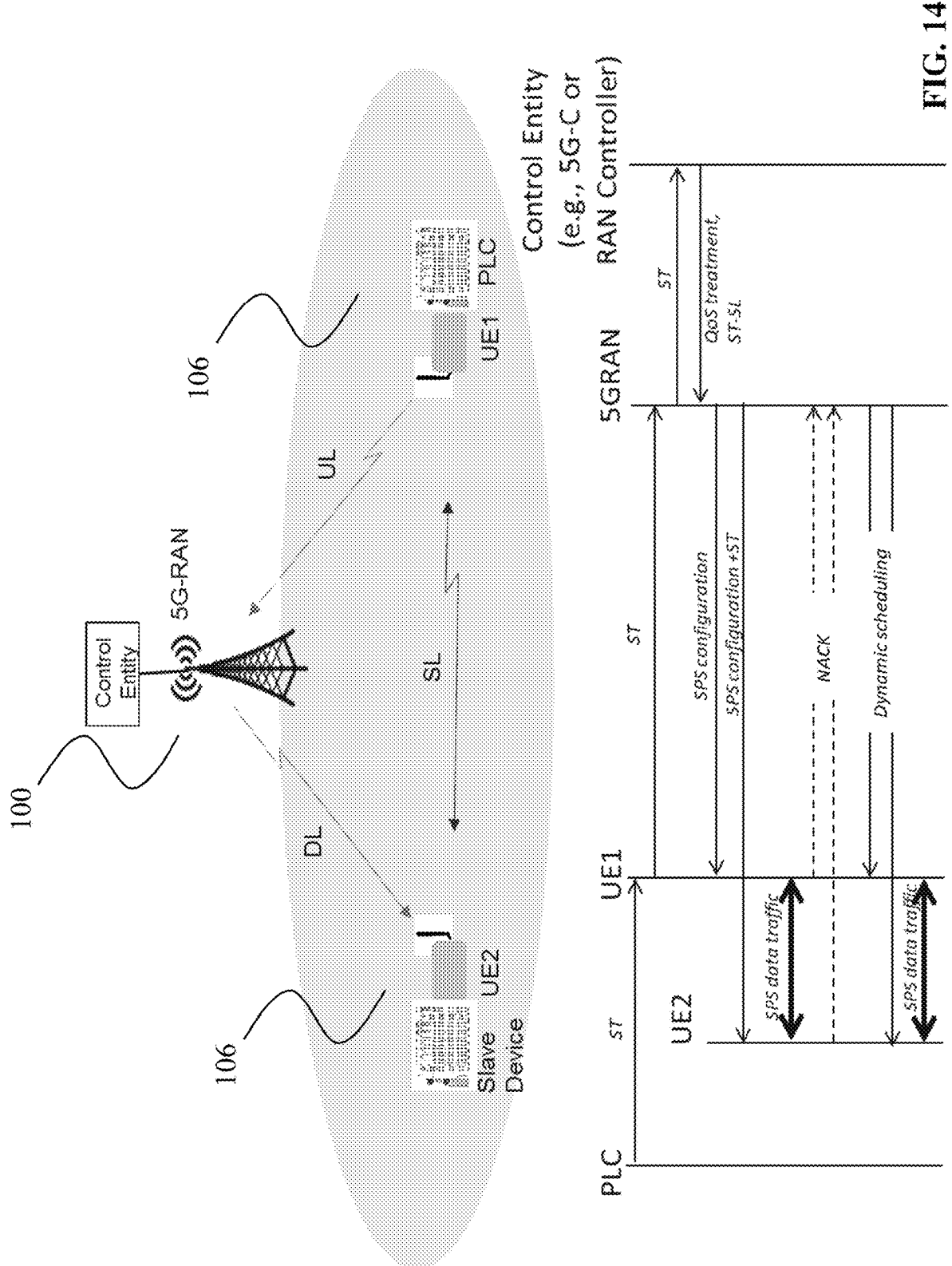
FIG. 14 shows a QoS treatment on the SL (Mode 1).

As shown in FIG. 14, the communication can be directly between two UEs 106 on the Sidelink (SL), also known as Device-to-Device (D2D) communication. In SL Mode 1, the resource allocation on the SL is controlled by an access node. e.g., the RAN entity 100. The UE 106 connected to the master device (e.g., PLC) shares the ST 201 with the RAN entity 100. Based on the QoS and ST 201, the RAN entity 100 assigns an SPS configuration for SL data traffic. Upon packet loss, the UEs 106 forward their NACK to the RAN entity 100. During the ST 201, the RAN entity 100 changes the UEs' SL configuration to dynamic resource scheduling. Here. ST 201 can be dedicated to the SL. i.e., ST-SL. The RAN entity 100 can also be a control entity 104. e.g., a CN entity (e.g., AMF) or a RAN controller.

In SL Mode 2, a UE 106 autonomously selects its transmission resources from resource pools and performs transport format selection to transmit SL data. There can be up to 8 transmission pools either pre-configured for out-of-coverage operation or provided by RRC signaling for in-coverage operation. Each pool can have one or more ProSe Per-Packet Priority (PPPP) values associated with it. For transmission of a MAC PDU, the UE 106 selects a transmission pool with an associated PPPP equal to the highest PPPP among the logical channels identified in the MAC PDU. The UE 106 performs sensing for selection of sidelink resources within the selected transmission pool. Based on sensing results, the UE (re)selects specific sidelink resources and may reserve periodically recurring (i.e., semi-persistent) sidelink resources. The application layer at the UE 106 sets the ProSe Per-Packet Priority (PPPP) for each packet when passing it to lower layers (PHY. MAC) for transmission. When lower layers receive the packet, they select one of the configured transmission pools (based on PPPP) and corresponding transmission parameters (Tx power. CR limit. MCS range. RB range, retransmission range) based on the PPPP and measured CBR.

In one embodiment, a ST counter 800 state can be transmitted by the application layer at the UE 106 to the lower layers together with PPPP information and/or QoS information. When lower layers have ST counter 800 information, they may select the transmission parameters not only based on the PPPP and measured CBR but also based on the state of the ST counter 800. In one embodiment, an additional parameter known as ProSe Per-Packet Reliability (PPPR) can also be used as part of the transmission parameter selection process, together with PPPP and ST counter information.

Figure 15:
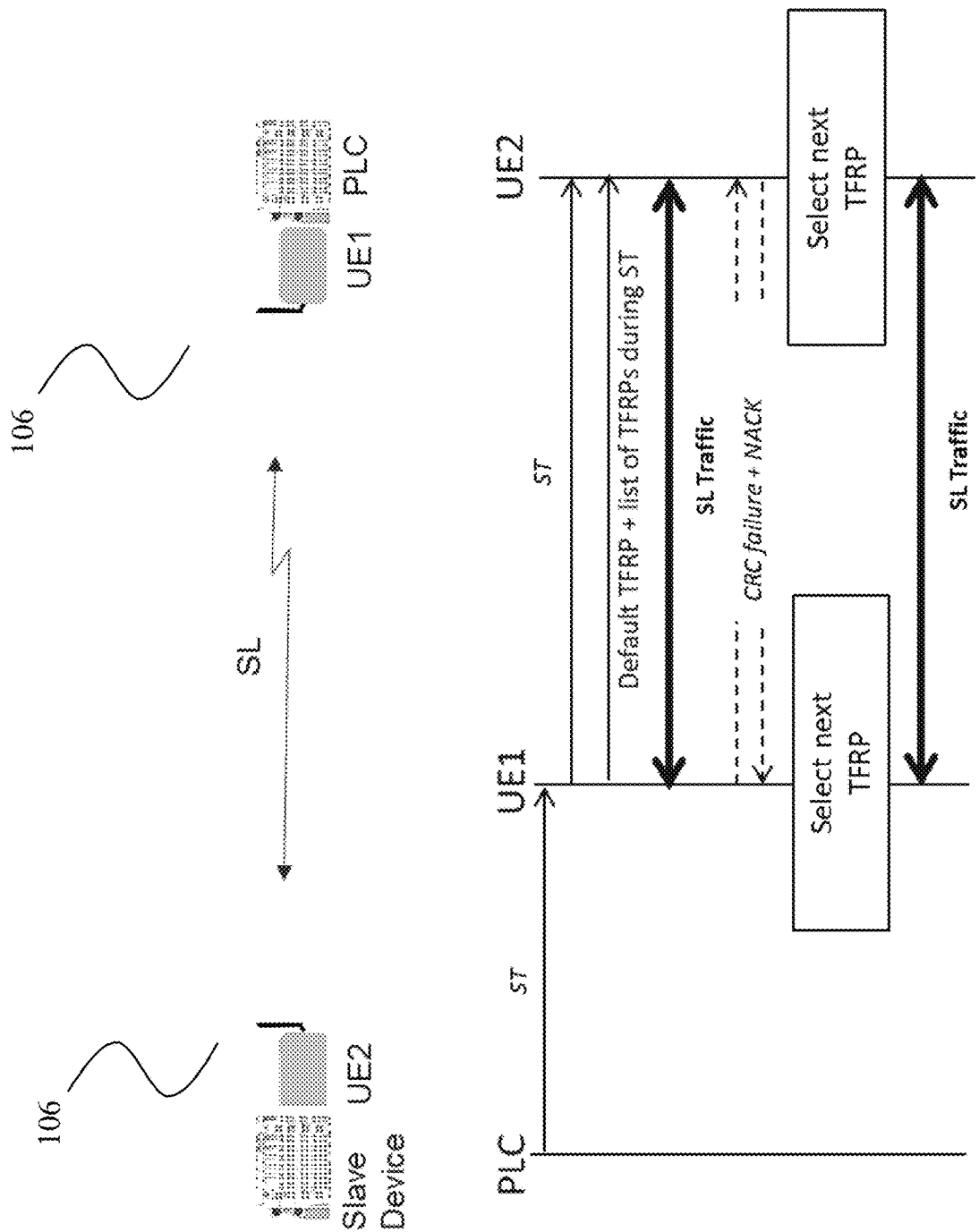
FIG. 15 shows a QoS treatment on the SL (Mode 2).

As shown in FIG. 15, in one embodiment, the UE 106 connected to the master device shares the ST 201 and a default Time-Frequency Repetition Pattern (TFRP) for SL transmission, as well as a list of TFRPs to be used during the ST 201 upon a transmission failure. If a NACK is received, each UE 106 selects the next TFRP in the list, which has more resources (e.g., more repetitions) and/or lower MCS, aiming at increased robustness.

Figure 16:
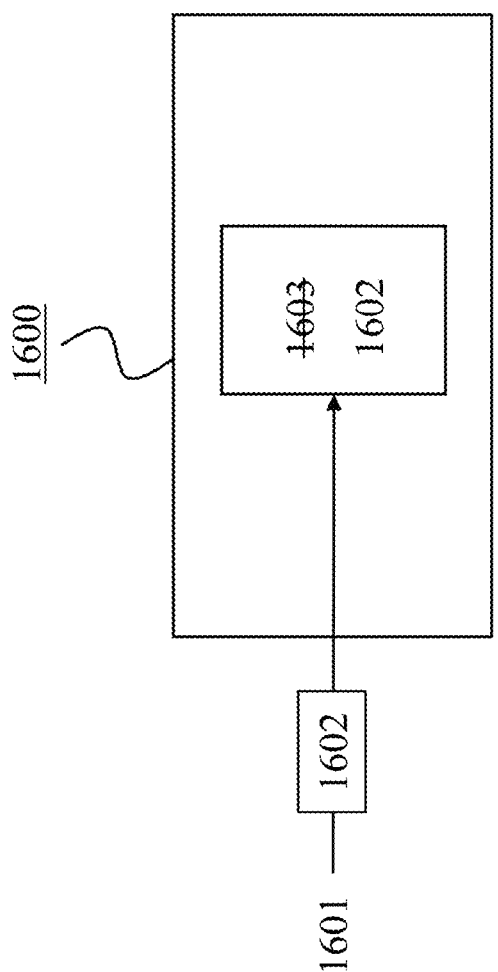
FIG. 16 shows a UE according to an embodiment of the disclosure.

FIG. 16 shows a UE 1600 according to an embodiment of the disclosure. The UE 1600 may be a mobile device, e.g., a smartphone, tablet, laptop or the like, or may be a terminal device, IoT device, IIoT device (e.g., sensor, actuator, PLC, etc.) or the like. The UE 1600 may be the same as the UE 106 described above in the previous embodiments (particularly as shown in FIGS. 1, 5, 6, 7, 9, 10, 11, 13, 14 and/or 15). The UE 1600 shown in FIG. 16 may, however, also be the RAN entity 100 as described above in the previous embodiments. The UE 1600 is generally configured to apply a QoS treatment based on the at least one resilience parameter 102.

The UE 1600 may comprise processing circuitry (not shown) configured to perform, conduct or initiate the various operations of the UE 1600 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable gate arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the UE 1600 to perform, conduct or initiate the operations or methods described herein.

The UE 1600 is configured to, if a transmission failure occurs in a SPS transmission of application data to and/or from the UE 1600, receive control information 1601, wherein the control information 1601 comprises a dynamic resource allocation 1602 to override or extend a configured resource allocation 1603 for a subsequent SPS transmission of application data to and/or from the UE 1600. The dynamic resource allocation 1602 provides a higher redundancy for the subsequent transmission than the configured resource allocation 1603.

FIG. 17 shows a method 1700 according to an embodiment of the disclosure. The method 1700 is performed by a RAN entity 100, in particular by the RAN entity 100 of FIG. 1. The method 1700 comprises a step 1701 of receiving information 101 indicating at least one resilience parameter 102 of an application 103, from a control entity 104 (e.g., from a CN entity), another RAN entity 105, and/or a UE 106 or UE 1600. The at least one resilience parameter 102 is based on a tolerance of the application 103 to transmission failures of application data, in particular consecutive transmission failures.

FIG. 18 shows a method 1800 according to an embodiment of the disclosure. The method 1800 is performed by a UE 1600, in particular by the UE 1600 of FIG. 16. The method 1800 may also be performed by the UE 106. The method 1800 comprises, if a transmission failure occurs in a SPS transmission of application data to and/or from the UE 1600/106, a step 1801 of receiving control information 1601, wherein the control information 1601 comprises a dynamic resource allocation 1602 to override or extend a configured resource allocation 1603 for a subsequent SPS transmission of application data to and/or from the UE 1600/106, wherein the dynamic resource allocation 1602 provides a higher redundancy for the subsequent transmission than the configured resource allocation 1603.

It is to be noted the TSN communication characteristics can be included inside a Time Sensitive Communication (TSC) Assistance Information (TSCAI) or TSN communication characteristics can be referred as TSCAI. Accordingly, the at least one resilience parameter can be included in a TSCAI. The TSCAI can be thus associated with a QoS flow.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. User equipment (UE), the UE comprising at least one processor, the UE being configured to, based on a transmission failure occurring in a semi-persistently scheduled (SPS) transmission of application data to or from the UE:

receive information indicating at least one resilience parameter of an application from a radio access network (RAN) entity, wherein the at least one resilience parameter is based on a tolerance of the application to consecutive transmission failures of application data; and receive control information, wherein the control information comprises a dynamic resource allocation to override or extend a configured resource allocation for a subsequent SPS transmission of application data to or from the UE, wherein the dynamic resource allocation provides a higher redundancy for the subsequent SPS transmission than the configured resource allocation.

2. The UE according to claim 1, wherein: the dynamic resource allocation includes at least one of:
a downlink assignment,
an uplink grant, or
a sidelink grant.

3. The UE according to claim 1, wherein the dynamic resource allocation provides the higher redundancy for the subsequent SPS transmission by at least one of:
increasing a number of resources for the subsequent SPS transmission,
increasing a number of retransmissions for the subsequent SPS transmission,
increasing a number of antennas to be used for the subsequent transmission,
adapting a modulation and coding scheme (MCS) for the subsequent SPS transmission, or
increasing a transmission power for the subsequent SPS transmission.

4. The UE according to claim 1, further configured to:
set up a survival time counter for the application based on the information or the at least one resilience parameter.

5. The UE according to claim 4, further configured to:
report channel state information (CSI) to the RAN entity based on a transmission failure of application data.

6. The UE according to claim 5, configured to:
determine a content of the CSI and report the CSI based on the state of the survival time counter.

7. The UE according to claim 1, wherein a robustness of a subsequent transmission is adapted based on the tolerance of the application to consecutive transmission failures.

8. A method for user equipment (UE) wherein the method comprises, based on a transmission failure occurring in a semi-persistently scheduled (SPS) transmission of application data to or from the UE:
receiving information indicating at least one resilience parameter of an application from a radio access network (RAN) entity, wherein the at least one resilience parameter is based on a tolerance of the application to consecutive transmission failures of application data; and
receiving control information, wherein the control information comprises a dynamic resource allocation to override or extend a configured resource allocation for a subsequent SPS transmission of application data to or from the UE, wherein the dynamic resource allocation provides a higher redundancy for the subsequent SPS transmission than the configured resource allocation.

9. The method according to claim 8, wherein:
the dynamic resource allocation includes at least one of:
a downlink assignment,
an uplink grant, or
a sidelink grant.

10. The method according to claim 8, wherein the dynamic resource allocation provides the higher redundancy for the subsequent SPS transmission by at least one of:
increasing a number of resources for the subsequent SPS transmission,
increasing a number of retransmissions for the subsequent SPS transmission,
increasing a number of antennas to be used for the subsequent transmission,
adapting a modulation and coding scheme (MCS) for the subsequent SPS transmission, or
increasing a transmission power for the subsequent SPS transmission.

11. The method according to claim 8, further comprising:
setting up a survival time counter for the application based on the information or the at least one resilience parameter.

12. The method according to claim 11, further comprising:
reporting channel state information (CSI) to the RAN entity based on a transmission failure of application data.

13. The method according to claim 12, further comprising:
determining a content of the CSI and reporting the CSI based on the state of the survival time counter.

14. A user equipment (UE) comprising at least one processor, wherein the UE is configured to, based on a transmission failure occurring in a semi-persistently scheduled (SPS) transmission of application data to or from the UE:
receive information indicating at least one resilience parameter of an application from a radio access network (RAN) entity, wherein the at least one resilience parameter is based on a tolerance of the application to consecutive transmission failures of application data:
set up a survival time counter for the application based on the information or the at least one resilience parameter:
determine a content of a channel state information (CSI) and report the CSI to the RAN entity based on the state of the survival time counter; and
receive control information, wherein the control information comprises a dynamic resource allocation to override or extend a configured resource allocation for a subsequent SPS transmission of application data to or from the UE, wherein the dynamic resource allocation provides a higher redundancy for the subsequent SPS transmission than the configured resource allocation.

* * * * *

UNITED STATES PATENT AND TRADEMARK OFFICE
CERTIFICATE OF CORRECTION

| | | |
|---|---|---|
| PATENT NO. | : 12,069,638 B2 | Page 1 of 1 |
| APPLICATION NO. | : 17/516288 | |
| DATED | : August 20, 2024 | |
| INVENTOR(S) | : Bulakci et al. | |

It is certified that error appears in the above-identified patent and that said Letters Patent is hereby corrected as shown below:

On the Title Page

Item (57) Abstract, Line 1: reads as "A Quality of Service (QOS) framework of mobile and" should read as -- A Quality of Service (QoS) framework of mobile and --.

In the Claims

Claim 14: Column 20, Line 44: reads as "consecutive transmission failures of application data:" should read as -- consecutive transmission failures of application data; --.

Claim 14: Column 20, Line 46: reads as "the information or the at least one resilience parameter:" should read as -- the information or the at least one resilience parameter; --.

Signed and Sealed this
Twenty-ninth Day of April, 2025

Coke Morgan Stewart
*Acting Director of the United States Patent and Trademark Office*